US011356648B2

(12) United States Patent
Sakai

(10) Patent No.: US 11,356,648 B2
(45) Date of Patent: Jun. 7, 2022

(54) INFORMATION PROCESSING APPARATUS, INFORMATION PROVIDING APPARATUS, CONTROL METHOD, AND STORAGE MEDIUM IN WHICH VIRTUAL VIEWPOINT VIDEO IS GENERATED BASED ON BACKGROUND AND OBJECT DATA

(71) Applicant: CANON KABUSHIKI KAISHA, Tokyo (JP)

(72) Inventor: Tomoya Sakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 16/827,784

(22) Filed: Mar. 24, 2020

(65) Prior Publication Data

US 2020/0228775 A1 Jul. 16, 2020

Related U.S. Application Data

(63) Continuation of application No. PCT/JP2018/027464, filed on Jul. 23, 2018.

(30) Foreign Application Priority Data

Sep. 26, 2017 (JP) ............................ JP2017-185319

(51) Int. Cl.
*H04N 13/111* (2018.01)
*H04N 13/117* (2018.01)
(Continued)

(52) U.S. Cl.
CPC ......... *H04N 13/117* (2018.05); *H04N 13/156* (2018.05); *H04N 13/282* (2018.05)

(58) Field of Classification Search
CPC .. H04N 13/117; H04N 13/156; H04N 13/282; H04N 21/4728; H04N 21/438;
(Continued)

(56) References Cited

U.S. PATENT DOCUMENTS 10,204,658 B2 2/2019 Krishnan
10,397,666 B2 8/2019 Thomas et al.
(Continued)

FOREIGN PATENT DOCUMENTS

CN 102831597 A 12/2012
CN 105915937 A 8/2016
(Continued)

OTHER PUBLICATIONS

"Study of ISO/IEC DIS 23000-20 Omnidirectional Media Format", 119. MPEG Meeting; Jul. 17, 2017-Jul. 21, 2017; Torino; (Motion Picture Expert Group or ISO/IEC JTC1/SC29/WG11), No. nl 6950 Aug. 26, 2017 (Aug. 26, 2017), XP030260182, (Year: 2017).*
(Continued)

*Primary Examiner* — Howard D Brown, Jr.
(74) *Attorney, Agent, or Firm* — Venable LLP

(57) ABSTRACT

An apparatus generates a plurality of albums including a first album and a second album, and includes a page generation unit to generate common pages to be arranged in both albums and individual pages including a first individual page to be arranged in the first album and not in the second album, and a second individual page to be arranged in the second and not in the first. The first album is album data that a first object is set as a main object. An image including the first object is arranged in the first individual page. The second album is album data that a second object is set as a main object. An image including the second object is arranged in the second individual page. A determination unit determines an arrangement order of the common pages and the individual pages.

18 Claims, 27 Drawing Sheets

(51) Int. Cl.
*H04N 13/156* (2018.01)
*H04N 13/282* (2018.01)

(58) Field of Classification Search
CPC ....... H04N 21/44218; H04N 21/21805; H04N 21/816
See application file for complete search history.

(56) References Cited

U.S. PATENT DOCUMENTS

| | | | | |
|---|---|---|---|---|
| 2017/0018540 | A1* | 1/2017 | Lim | H01L 24/97 |
| 2017/0026680 | A1* | 1/2017 | Sugio | H04N 21/2187 |
| 2017/0346866 | A1* | 11/2017 | Champel | H04N 21/816 |
| 2019/0108859 | A1 | 4/2019 | Krishnan | |
| 2020/0036952 | A1* | 1/2020 | Iwane | G06T 15/20 |
| 2020/0145635 | A1* | 5/2020 | Yoneda | H04N 21/42204 |

FOREIGN PATENT DOCUMENTS

| | | | |
|---|---|---|---|
| CN | 106537894 | A | 3/2017 |
| EP | 3112985 | A1 | 1/2017 |
| JP | 2009135601 | A | 6/2009 |
| JP | 2013183209 | A | 9/2013 |
| JP | 2015187797 | A | 10/2015 |
| JP | 2017527160 | A | 9/2017 |
| RU | 2647645 | C1 | 3/2018 |
| WO | 2015197815 | A1 | 12/2015 |

OTHER PUBLICATIONS

"3GPP TR 26. 918 V1.2. 0 (Jun. 2017)", 3GPP, [online], Jul. 3, 2017, [retrieved on Aug. 28, 2018], pp. 1-23,37,38,48,49,88,95, Retrieved from the Internet: <URL: http://www.3gpp.org/ftp//Specs/archive/26_series/26.918/26918-120. Zip>.

"ISO/IEC 23009-1:2013/Cor. 1:2012(E)", ISO/IEC JTC 1/SC 29/WG 11, [online], Nov. 3, 2014, p. 27, [retrieved on Aug. 30, 2018], Retrieved from the Internet: <URL: http://www.3gpp.org/ftp/tsg_sa/WG4_CODEC/TSGS4_81/Docs/S4-141284. Zip>.

Champel, M-L., et al., "Key factors for a high-quality VR experience", Proceedings of SPIE, Sep. 19, 2017, vol. 10396, Pages from 103960Z-1 to 103960Z-12, <DOI: 10.1117/12.2274336>.

Choi, B., et al., "WD on ISO/IEC 23000-20 Omnidirectional Media Application Format", ISO/IEC JTC1/SC29/WG11, [online], N16189, Jun. 3, 2016, [retrieved on Mar. 5, 2018], Retrieved from the Internet: <URL: https://mpeg. chiariglione. org/sites/default/files/files/standards/parts/docs/w16189. zip>.

Domanski, M., et al., "Immersive visual media-MPEG-I: 360 video, virtual navigation and beyond", Proceedings of 2017 International Conference on Systems, Signals and Image Processing (IWSSIP), May 24, 2017, pp. 1-9, ISBN: 978-1-5090-6344-4, <DOI: 10. 1109/IWSSIP. 17. 7965623>.

Hamza, A., et al., "Adaptive Streaming of Interactive Free Viewpoint Videos to Heterogeneous Clients", [online], Proceedings of MMSys'16, May 13, 2016, pp. 1-12, [retrieved on Aug. 23, 2018], Retrieved from the Internet: <URL: http://ds.qcri.org/publications/2016-hamza-mmsys.pdf>, ISBN: 978-1-4503-4297-1, <DOI: 10.1145/2910017.2910610>.

International Search Report and Written Opinion dated Sep. 18, 2018, in International Patent Application No. PCT/JP2018/027464.

"Study of ISO/IEC DIS 23000-20 Omnidirectional Medial Format", 119, MPEG Meeting, Jul. 17, 2017-Jul. 21, 2017; Torino; (Motion Picture Expert Group of ISO/IEC JTC1/SC29/WG11), No. n16950, Aug. 26, 2017, XP030260182, Retrieved from the Internet: URL:http://phenix.int-evry.fr/mpeg/doc_end_user/documents/119_Torino/wg11/w16950.zipw16950_OMAF_SoDIS_clean.docx [retrieved on Aug. 26, 2017], paragraphs [08.1], [0B.3], [0B.4].

Ali C Begen et al.: "Dash VR: Director's Cut Signaling in Streaming of 360° Videos", 116. MPEG Meeting; Oct. 14, 2016-Oct. 21, 2016; Chengdu; (Motion Picture Expert Group or ISO/IEC JTC1/SC29/WG11), No. M39425, Oct. 12, 2016, XP030067771, Retrieved from the Internet: URL:http://phenix.int-evry.fr/mpeg/doc_end_user/documents/116_Chengdu/wg11/m39425-v1-m39425_Directors_Cut_Signaling.docx.zipm39425_Directors_Cut_Signaling.docx [retrieved on Oct. 12, 2016)].

Vr Industry Forum: "Draft for Public Preview About this Guidelines Preview", Sep. 13, 2017, pp. 1-68, XP055730380, VR Industry Forum Retrieved from the Internet: URL:http://www.vr-if.org/wp-content/uploads/VRIF_Draft_Guidelines-v0.0draft10-2017-09-12.pdf [retrieved on Sep. 14, 2020], paragraphs [5.4.3.1], [5.4.3.3], [5.4.3.4].

Sejin Oh (LGE) et al.: "Signaling of VR video metadata in Dash MPD", 116. MPEG Meeting; Oct. 14, 2016-Oct. 21, 2016; Chengdu; (Motion Picture Exper Group or ISO/IEC JTC1/SC29/WG11), No. m39226, Oct. 12, 2016, XP030067572, Retrieved from the Internet: URL:http://phenix.int-evry.fr/mpeg/doc_end_user/documents/116_Chengdu/wg11/m39226-v1-m39226_DASH_vr_metadata.docx [retrieved on Oct. 12, 2016].

Search Report dated May 28, 2021, issued in European Patent Application No. 10179193WOEP01.

Martens, G., "Bandwidth management for ODV tiled streaming with MPEG-DASH", Universiteit Hasselt (Master thesis), [online], Mar. 7, 2015, pp. 1-157, Retrieved from the Internet: <URL: http://uhdspace.uhasselt.be/dspace/handle/1942/19390>.

Office Action dated Mar. 19, 2021, issued in Korean Patent Application No. 10-2020-7010964.

Office Action dated Jul. 21, 2021, issued in Chinese Patent Application No. 201880062439.3 (with English translation).

Feng Qian et al., "Optimizing 360 Video Delivery Over Cellular Networks", pp. 1 to 6.

* cited by examiner

```
<MPD>
<!–6DoF object->
<AdaptationSet id="1"...codecs="6dof_v_codec"...>
1702 <SupplementalProperty
schemeIdUri="urn:mpeg:dash:6dof"value="source, x, x_offset, y, y_offset, z, z_offset,
yaw, yaw_offset, roll, roll_offset, pitch, pitch_offset, depth, depth_offset">

1703 <SupplementalProperty
schemeIdUri="urn:mpeg:dash:6dof_vector"  value="x, y, z, yaw, roll, pitch, depth">

1704 <SupplementalProperty
schemeIdUri="urn:mpeg:dash:6dof_init"  value="x, y, z, yaw, roll, pitch, depth">

1705 <SupplementalProperty
schemeIdUri="urn:mpeg:dash:stereo" value="stereo">

</AdaptationSet...>

1706 <AdaptationSet id="2"...codecs="avc1..." ...>
 <Representation ... ></Representation>
</AdaptationSet...>

1707 <AdaptationSet id="3"...codecs="hvc1..." ...>
 <Representation ... ></Representation>
</AdaptationSet...>

</MPD>
```

```
<MPD>
<!–6DoF video ->
<AdaptationSet id="1"...codecs="6dof_v_codec"...>
<SupplementalProperty
schemeIdUri="urn:mpeg:dash:6dof"value="source, x, x_offset, y, y_offset, z,
z_offset, yaw, yaw_offset, roll, roll_offset, pitch, pitch_offset, depth,
depth_offset, total_x, total_x_offset, Total_y, total_y_offset,  total_z,
total_z_offset, total_yaw, total_yaw_offset, total_roll, total_roll_offset,
total_pitch, total_pitch_offset, total_depth, total_depth_offset">
</AdaptationSet...>

<AdaptationSet id="2"...codecs="6dof_v_codec"...>
<SupplementalProperty
schemeIdUri="urn:mpeg:dash:6dof"value=...>

<Representation... ></Representation>
</AdaptationSet...>

</MPD>
```

```
<MPD>
<!–6DoF video ->
<AdaptationSet id="1"...codecs="6dof_v_codec"...>
<SupplementalProperty
schemeIdUri="urn:mpeg:dash:6dof"value="source, x, x_offset, y, y_offset,
z, z_offset, yaw, yaw_offset, roll, roll_offset, pitch, pitch_offset, depth,
depth_offset,">
<SupplementalProperty schemeIdUri="urn:mpeg:dash:6dof"value="
total_x, total_x_offset, total_y, total_y_offset,  total_z, total_z_offset,
total_yaw, total_yaw_offset, total_roll, total_roll_offset, total_pitch,
total_pitch_offset, total_depth, total_depth_offset">
</AdaptationSet...>

<AdaptationSet id="2"...codecs="6dof_v_codec"...>
<SupplementalProperty
schemeIdUri="urn:mpeg:dash:6dof"value=...>

<Representation... ></Representation>
</AdaptationSet...>

</MPD>
```

```
<MPD>
<!–6DoF background->
<AdaptationSet id="1"...codecs="6dof_v_codec_background...">
<EssentialProperty
schemeIdUri="urn:mpeg:dash:6dof_background" value="source, x, x_offset, y,
y_offset, z, z_offset, yaw, yaw_offset, roll, roll_offset, pitch, pitch_offset, depth,
depth_offset">
</AdaptationSet...>

<AdaptationSet id="2"...codecs="6dof_v_object..." associationType="pcbg"
associationID="1">
<SupplementalProperty
schemeIdUri="urn:mpeg:dash:6dof_object" value="Mandatory, x, y, z, yaw, roll,
pitch">
</AdaptationSet...>

<AdaptationSet id="3"...codecs="6dof_v_object..." associationType="pcbg"
associationID="1">
<SupplementalProperty
schemeIdUri="urn:mpeg:dash:6dof_object" value="Optional, x, y, z, yaw, roll,
pitch">
</AdaptationSet...>

</MPD>
```

```
<MPD>
<!–6DoF video ->
<AdaptationSet id="1"...codecs="6dof_v_codec"...>
<SupplementalProperty
schemeIdUri="urn:mpeg:dash:6dof"value="source, x, x_offset, y, y_offset, z,
z_offset, yaw, yaw_offset, roll, roll_offset, pitch, pitch_offset, depth,
depth_offset">
<SupplementalProperty
schemeIdUri="urn:mpeg:dash:windowed_area"
value="x, x_offset, y, y_offset, z, z_offset, yaw, yaw_offset, roll, roll_offset, pitch,
pitch_offset, depth, depth_offset">
</AdaptationSet...>

</MPD>
```

```
<MPD>
<!–6DoF video ->
<AdaptationSet id="1"...codecs="6dof_v_codec"...>
<SupplementalProperty
schemeIdUri="urn:mpeg:dash:6dof"value="source, x, x_offset, y, y_offset, z,
z_offset, yaw, yaw_offset, roll, roll_offset, pitch, pitch_offset, depth,
depth_offset">
<SupplementalProperty
schemeIdUri="urn:mpeg:dash:limited_dof" value="4">
</AdaptationSet...>

<AdaptationSet>
<Representation id="4" associationId="1" associationType="cdsc"
codecs="limited_6dof"></Representation>
</AdaptationSet>

</MPD>
```

```
<MPD>
<!–6DoF object ->
<AdaptationSet id="1"...codecs="6dof_v_codec"...>
<SupplementalProperty
schemeIdUri="urn:mpeg:dash:6dof"value="source, x, x_offset, y, y_offset, z,
z_offset, yaw, yaw_offset, roll, roll_offset, pitch, pitch_offset, depth,
depth_offset">
<SupplementalProperty
schemeIdUri="dynamic_6dof" value="4, 5">
</AdaptationSet...>

...
<AdaptationSet...codecs="6doc" >
<Representation id="4" associationType="cdsc" codecs="6doc">
<Representation id="5" associationType="cdsc" codecs="6doc">
</AdaptationSet>
...

</MPD>
```

INFORMATION PROCESSING APPARATUS, INFORMATION PROVIDING APPARATUS, CONTROL METHOD, AND STORAGE MEDIUM IN WHICH VIRTUAL VIEWPOINT VIDEO IS GENERATED BASED ON BACKGROUND AND OBJECT DATA

CROSS-REFERENCE TO RELATED APPLICATIONS

This application is a Continuation of International Patent Application No. PCT/JP2018/027464, filed Jul. 23, 2018, which claims the benefit of Japanese Patent Application No. 2017-185319, filed Sep. 26, 2017, each of which is hereby incorporated by reference herein in its entirety.

BACKGROUND OF THE INVENTION

Field of the Invention

The present invention relates to an information processing apparatus, an information providing apparatus, a control method, and a storage medium, and specifically relates to technology for distributing media data.

Background Art

In recent years, discussions about a virtual viewpoint video (free viewpoint video) that enables viewing of contents from a virtual viewpoint are progressing. Japanese Patent Laid-Open No. 2015-187797 describes a method for generating such a virtual viewpoint video. Also, Japanese Patent Laid-Open No. 2013-183209 describes a system provided with a processing apparatus that selects which of a plurality of videos that are respectively captured by a plurality of cameras and have resolutions different to each other is to be transmitted in order to perform streaming of a multi-viewpoint video to one client PC.

The fact that processing load may increase as a result of providing a plurality of processing apparatuses respectively corresponding to a plurality of viewpoints when a video is distributed is not considered in the technology described in Japanese Patent Laid-Open No. 2013-183209.

SUMMARY OF THE INVENTION

The present invention aims to establish a technology for distributing media data while suppressing a processing load.

An information processing apparatus according to one embodiment of the present invention is an information processing apparatus including an obtainment unit configured to obtain first data in which information regarding video data is described, and second data including the video data, a determination unit configured to determine whether a predetermined value indicating that information regarding a virtual viewpoint video that can be viewed by setting at least one of the viewpoint position, line of sight direction, and focal position is included is described in the first data, and a control unit configured to control reproduction of video data included in the second data, wherein the obtainment unit obtains the second data based on a result of a determination made by the determination unit and the first data.

An information providing apparatus according to one embodiment of the present invention is an information providing apparatus that provides, to an information processing apparatus that obtains second data including video data based on first data in which information regarding video data is described, the first data, the information providing apparatus comprising a generating unit configured to generate the first data including a predetermined value indicating that information regarding a virtual viewpoint video that can be viewed by setting at least one of a viewpoint position, a line of sight direction, and a focal position is included, and a providing unit configured to provide the first data to the information processing apparatus.

Further features of the present invention will become apparent from the following description of exemplary embodiments with reference to the attached drawings.

BRIEF DESCRIPTION OF THE DRAWINGS

The attached drawings are included in, and constitute a part of, the specification, illustrate embodiments of the present invention, and are used together with the description thereof to explain the principle of the present invention.

FIG. 17 is a diagram illustrating a first example of description contents of an MPD file.

FIG. 18A is a diagram illustrating a second example of the description contents of the MPD file.

FIG. 18B is a diagram illustrating the second example of the description contents of the MPD file.

FIG. 19 is a diagram illustrating a third example of the description contents of the MPD file.

FIG. 20A is a diagram illustrating a fourth example of the description contents of the MPD file.

FIG. 20B is a diagram illustrating the fourth example of the description contents of the MPD file.

FIG. 21 is a diagram illustrating a fifth example of the description contents of the MPD file.

DESCRIPTION OF THE EMBODIMENTS

Hereafter, embodiments will be described with reference to the attached drawings. Note that the following embodiments are not intended to limit the invention. For example, cases when at least a portion or, in some cases, all of the configuration or steps of the method of the following embodiments are not included may also be included in the scope of the present invention.

System Configuration

Figure 1:
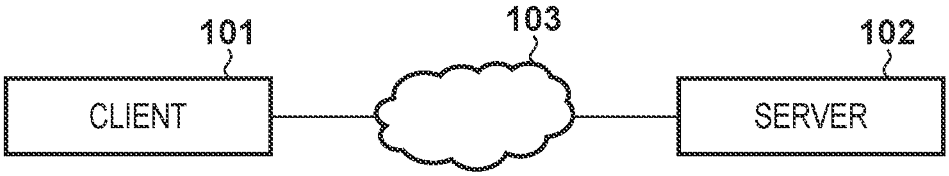
FIG. 1 is a diagram illustrating an exemplary configuration of a system.

FIG. 1 shows an exemplary configuration of a communication system according to the present embodiment. In one example, the communication system includes a client 101 and a server 102, and the client 101 and the server 102 are connected via a network 103. The client 101 may be an information processing apparatus including a display function such as a DTV (Digital TV), an HMD (Head-Mounted Display), a multi-view television, a smartphone, or a tablet. The client 101 may be a concept expressing a Web browser or other applications installed in a PC (Personal Computer), or the like. That is, the client 101 is not necessarily realized as an apparatus. Also, the client 101 may also be a projector including a projection apparatus, or a multi-projector including a plurality of projection apparatuses. In one example, the server 102 is a digital camera, a digital video camera, a network camera, a projector, a mobile phone, a smartphone, a PC, or a server apparatus, and is an information providing apparatus functioning as a server apparatus that transmits video data. In the present embodiment, the server 102 is one PC, as an example, but the function of the server 102 may be realized, in a distributed manner, by one or more apparatuses arranged in a distributed manner in a cloud, for example. The network 103 may be a public mobile communication network such as a LAN (Local Area Network), a WAN (Wide Area Network), or an LTE (Long Term Evolution), or may be a combination thereof, for example. The LAN is configured by a wired LAN such as an Ethernet (registered trademark) or a wireless LAN conforming to the IEEE 802.11 standard series, or the like. The WAN may be the Internet, for example. Note that the client 101 and the server 102 may be directly connected without the network 103 being interposed therebetween. For example, the client 101 and the server 102 may directly communicate using a wireless ad hoc network.

In the present embodiment, the server 102 can provide, to another apparatus, video data obtained by encoding virtual viewpoint video data that can be viewed while at least one of the viewpoint position, line of sight direction, and focal position is freely set (moved) in a space. The client 101 obtains and reproduces the video data in accordance with a situation. Here, it is assumed that, in the present embodiment, a technology (MPEG-DASH, HTTP Live Streaming, or the like) for dynamically changing the stream to be obtained in accordance with the capability of the client 101 and the communication situation is used. Note that MPEG-DASH is an acronym of Moving Picture Experts Group-Dynamic Adaptive Streaming over HTTP. In these technologies, video data is divided into segments in units of fine time periods, and an URL (Uniform Resource Locator) for obtaining the segments is described in a file called a play list. The server 102 prepares and provides this play list to the client 101, and the client 101, upon receiving this file, first obtains the play list and obtains desired video data using information described in the play list. As a result of URLs corresponding to video data segments of a plurality of versions being described in the play list, the client 101 can obtain a video data segment of an optimum version in accordance with its capability or a communication environment. In this case, the server 102 provides the file relating to the play list to the client 101, but need not provide the video data directly to the client 101. That is, the client 101 may obtain a video data segment from an external apparatus by accessing the described URL based on information provided from the server 102. Note that, in the following, the description will be given assuming that an MPD (Media Presentation Description) stipulated in MPEG-DASH is used as a file of the play list. Note that another protocol may also be used that uses play list description such as HTTP Livestreaming or Smooth Streaming in place of MPEG-DASH. That is, the following discussion can be applied to a system in which, at least, the client 101 obtains information such as a play list relating to video data and obtains the video data based on the information.

In the following, first, an outline of virtual viewpoint video (free viewpoint video) data to be transmitted will be described, and, thereafter, an example of the apparatus configuration and the processing flow will be described.

Outline of Virtual Viewpoint Video Data to be Transmitted

In the following, the virtual viewpoint video data to be transmitted in the present embodiment will be described. Note that the virtual viewpoint video is assumed to be generated as in a known technology, and the parameters relating to the virtual viewpoint video that are to be transmitted in the present embodiment will be mainly described.

Figure 2A:
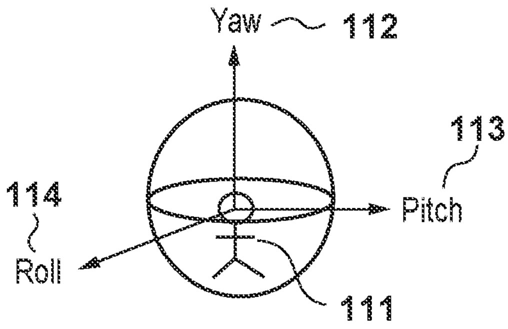
FIG. 2A is a diagram illustrating a configuration of a virtual viewpoint video to be distributed.

FIG. 2A shows an example of the movement range of the line of sight direction of a user in a virtual viewpoint video. The user 111 can rotate the line of sight about an axis 112 indicating Yaw, an axis 113 indicating Pitch, and an axis 114 indicating Roll. Note that, in the following, the description will be given assuming that the user can freely change the line of sight in each of the three axes, but the line of sight settable range may be limited such as limiting a range in accordance with contents or a predetermined setting of the video data, for example. For example, a limitation in which rotation of the line of sight about the Roll axis is not allowed, or a limitation in which the settable range of the user viewpoint is a semi-celestial sphere may be used. Also, the viewpoint settable ranges with respect to the three axes may be limited separately or in a mutually related manner. Also, the values indicating the line of sight settable range may be expressed using relative coordinates, or using absolute coordinates. When the relative coordinates are used, values in a range from 0.0 to 1.0 may be used as the line of sight settable range, for example. When the absolute coordinates are used, values in a range from 0 to 360, or −180 to 180 may be used as the line of sight settable range. Also, the movement unit of the line of sight direction may be a fixed value, or may be a variable value. Also, a list of values by which the line of sight direction can move may be provided.

Figure 2B:
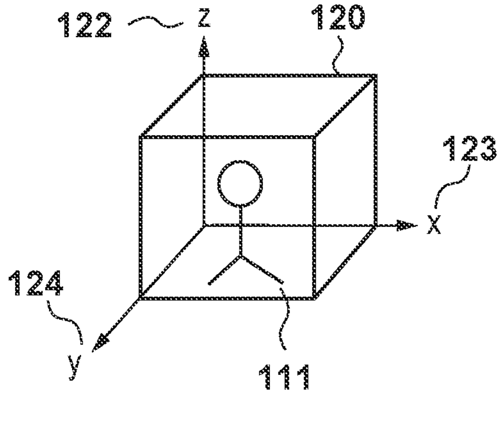
FIG. 2B is a diagram illustrating a configuration of a virtual viewpoint video to be distributed.

Next, FIG. 2B shows an example of the movement range of the viewpoint position of a user in the virtual viewpoint video. The user 111 can move the viewpoint position in each of a z axis 122 direction, an x axis 123 direction, and a y axis 124 direction. Here, a range 120 indicates the range in which the user viewpoint can be moved in the virtual viewpoint video. Note that, in the following, the description will be given assuming that the user viewpoint can be moved along each of the three axes, but the movement may be limited in accordance with contents or a predetermined setting of the video data, for example. For example, a limitation may be applied in which the viewpoint cannot be moved in a predetermined direction such as a z-axis direction, or a movable range may be set to each of the x, y, and z axes. Note that the movable ranges with respect to the plurality of axes may be set in a mutually related manner, or may be set separately, for example. Also, the movable range may be expressed by either relative coordinates or absolute coordinates. When the relative coordinates are used, values in a range from 0.0 to 1.0 may be used as the movable range, for example. Also, when the absolute coordinates are used, the movable range may be defined by numerical values in units of a predetermined distance. Note that the values of the movable range in the respective x, y, and z axes directions may be set separately or so as to be in a fixed relationship based on the virtual viewpoint video data, or may be predetermined values, for example. Also, the movement unit of the viewpoint position may be a fixed value or a variable value. Also, a list of values by which the viewpoint position can move may be provided.

Figure 2C:
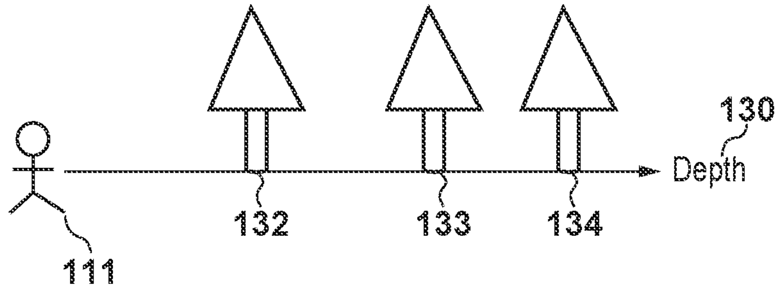
FIG. 2C is a diagram illustrating a configuration of a virtual viewpoint video to be distributed.

In the virtual viewpoint video, moreover, the range of a focal position may be designated. FIG. 2C is a diagram illustrating an example of the focal position in the virtual viewpoint video. The user 111 can move the focal position with respect to a depth direction of an axis 130. Note that, in regards to the movement of the focal position with respect to the virtual viewpoint video, the user can be allowed to freely move the focal point, or positions such as positions 132 to 134 may be defined in advance as the positions to which the focal position can be brought. As a result of being provided with information regarding the focal position in addition to the viewpoint position and the line of sight direction, the user can flexibly view a virtual viewpoint video. With this, by utilizing information regarding the focal position, the user experience can be improved.

Figure 2D:
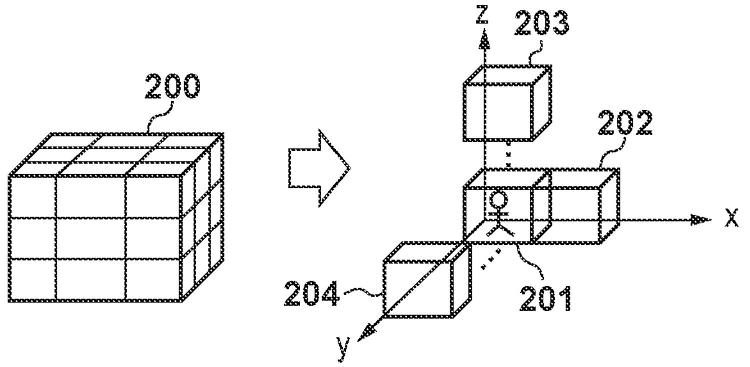
FIG. 2D is a diagram illustrating a configuration of a virtual viewpoint video to be distributed.

Note that the virtual viewpoint video can be encoded for each divided space region. FIG. 2D shows an example in which a space 200 of the virtual viewpoint video is divided into a plurality of regions based on the three axes of the user movement range. The example in FIG. 2D shows an example in which the space 200 is divided into 3×3×3 regions. When such division is performed, the user can perform decoding and reproduction by only obtaining pieces of video data of the space regions needed by the user. For example, the user 111 obtains only the video data of a region 201 to which the user belongs based on the viewpoint position in the virtual viewpoint video being viewed. Thereafter, if the user viewpoint position moves in the x axial direction and enters a region 202, the user 111 obtains the video data of the region 202. On the other hand, if the user viewpoint position moves in the z axial direction and enters a region 203, the user 111 obtains the video data of the region 203. Accordingly, at least one of prevention of the communication band of the network needed for viewing the virtual viewpoint video from increasing and reduction of the load of the decoding processing can be achieved.

Note that the division of the space region of the virtual viewpoint video is not limited to the division to spaces illustrated by 3×3×3 rectangular solids, as illustrated in FIG. 2D. For example, the regional division may be performed so as to have a different number of rectangular solids in the respective moving directions such as 1×2×3 or 2×3×2. Also, in the example in FIG. 2D, division is performed with respect to each of the three axes, but division with respect to some axes may be performed such as division only by one plane, e.g., division by an xy plane along the z axis, division by a yz plane along the x axis, or a division by an xz plane along the y axis. Also, in FIG. 2D, division with respect to the moving direction is performed, but division with respect to the viewpoint direction or the focal position may be executed in place of or in addition to the division with respect to the moving direction.

Figure 2E:
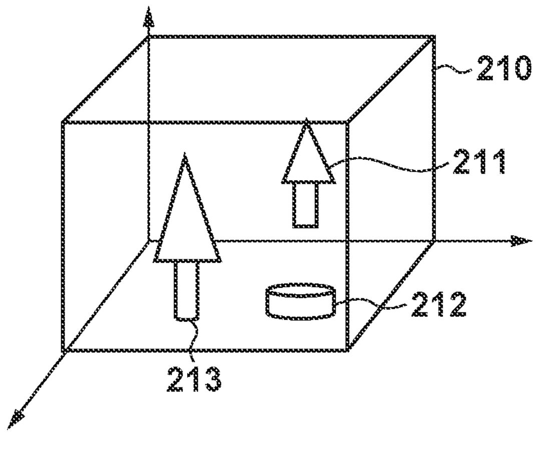
FIG. 2E is a diagram illustrating a configuration of a virtual viewpoint video to be distributed.

Also, prevention of the communication band of the network needed for viewing the virtual viewpoint video from increasing and reduction of the load of the decoding processing can further be performed by only obtaining data of an object that the user desires to view and background data. FIG. 2E shows an example of a case when video data is divided into background data and object data, and encoding is performed for each piece of data, in order to perform such processing. The background data includes a background 210 and a background object 211 included in the background, and is handled separately from pieces of object data regarding one or more objects 212 and 213 included in the space of the virtual viewpoint video. The client 101 obtains the object data and the background data separately, and generates the virtual viewpoint video. Also, the client 101 can obtain and display a background video and an object desired to be displayed (the object of interest, for example). For example, a technique such as point group encoding for separately encoding a background and an object can be applied.

Figure 3A:
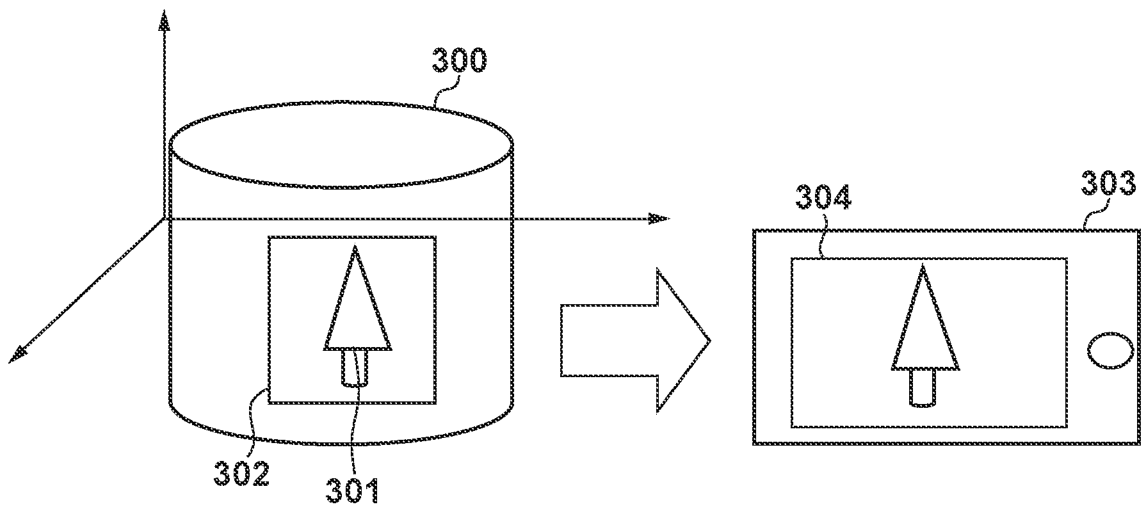
FIG. 3A is a diagram illustrating the distribution of a virtual viewpoint video.

Note that, in a system that provides a virtual viewpoint video, as a result of limiting the movement range of the user viewpoint position, contents can be viewed by the user as intended by a content creator that created the virtual viewpoint video or the probability thereof can be increased, and the user experience can be improved. FIG. 3A shows an example of the virtual viewpoint video (windowed virtual viewpoint video, which may also be called as Windowed Six Degrees of Freedom) in which the movement range is limited. In FIG. 3A, an entering prohibited range 300 is a range in which entering of the viewpoint position is prohibited in a windowed virtual viewpoint video. The viewpoint position of the user 111 cannot enter the entering prohibited range 300. An object 301 is an object to be displayed in the virtual viewpoint video. A region 302 indicates a portion that is cut out by a window. Such a windowed virtual viewpoint video may be viewed through a display apparatus 303 of a smartphone, a tablet, or the like. The display apparatus 303 can display the virtual viewpoint video cut out from the region 302 in a display region 304. The user 111 cannot move the viewpoint position to the inside of the entering prohibited range 300, but can view the object 301 along any direction from a position outside the entering prohibited range 300. Note that, in the example in FIG. 3A, the entering prohibited range 300 is illustrated as a column, but this is merely an example, and the movement prohibited range may be designated by designating any region such as a rectangular solid or a triangular prism. Note that the line of sight direction of the user may be limited in the windowed virtual viewpoint video. For example, in the example in FIG. 3A, a limitation may be applied such that the line of sight direction of the user is constantly oriented toward the central portion of the cone.

Figure 3B:
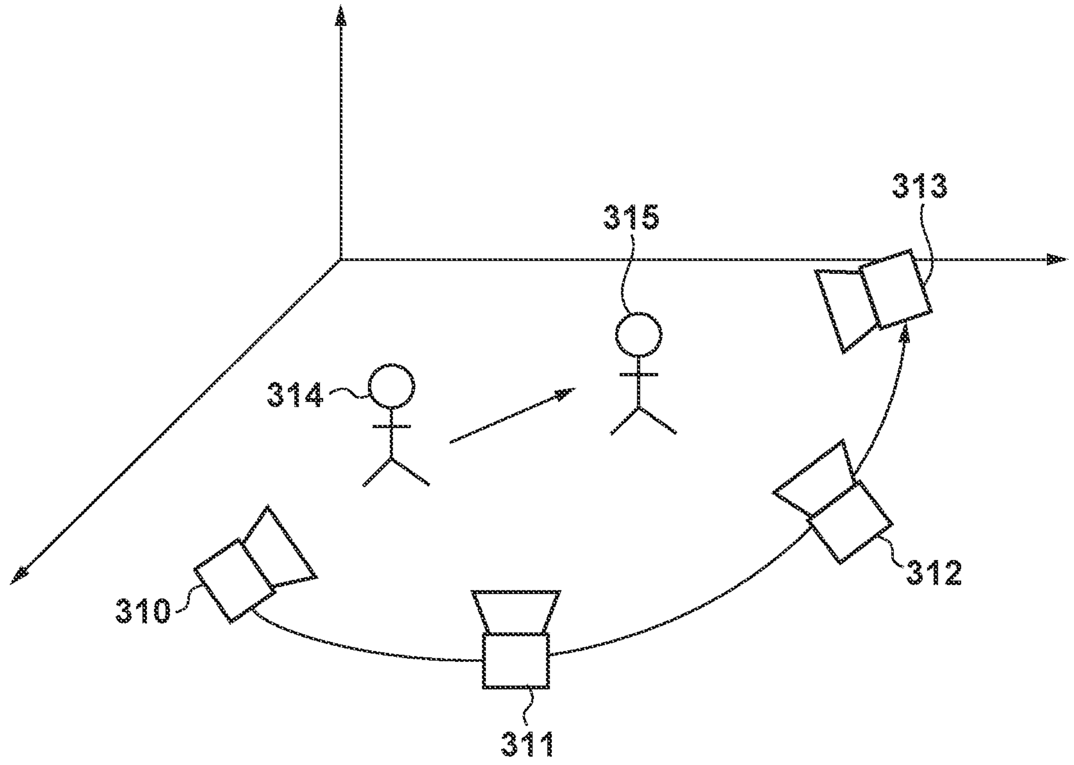
FIG. 3B is a diagram illustrating the distribution of a virtual viewpoint video.

Also, the viewpoint position and the line of sight direction of the user may be controlled using TimedMetadata. TimedMetadata is a mechanism that is defined in ISO Base Media File Format for providing metadata that is effective for improving the user experience to the client 101, for example. FIG. 3B shows an example of a case when the server 102 provides information indicating the relationship between the viewpoint position and line of sight direction and time by TimedMetadata. For example, it is assumed that, in the virtual viewpoint video, an object that is present at a point 314 at time t01 is moved to a position 315 at time t02. In this case, with TimedMetadata, metadata for allowing the user to view the virtual viewpoint video with a recommended viewpoint position/recommended line of sight direction is provided, for example. For example, a viewpoint position/line of sight direction 310 at time t11, a viewpoint position/line of sight direction 311 at time t12, a viewpoint position/line of sight direction at time t13, and a viewpoint position/line of sight direction 313 at time t14 are provided as information regarding the recommended viewpoint position/recommended line of sight direction. The client 101 may obtain the viewpoint position and line of sight direction of a camera at a time not described in the metadata based on the viewpoint positions and line of sight directions described in the metadata using a linear interpolation or another interpolation method. Note that the recommended viewpoint position/recommended line of sight direction may be designated by a mechanism other than TimedMetadata. Also, it is possible to prohibit the movement of the viewpoint and the line of sight using the mechanism such as TimedMetadata. With this, the range, or the like, to which the user cannot move can be dynamically changed for each time. In this way, with data that defines the relationship between time and the viewpoint position/line of sight direction, such as TimedMetadata, the probability that the user can view, in the virtual viewpoint video, an object to which the user should pay attention from a recommended viewpoint can be increased. Also, with this, the user experience can be improved.

Note that, focal point information may be provided in addition to, or in place of, the viewpoint position/line of sight direction with TimedMetadata. TimedMetadata may be used as designation information for designating one or more parameters such as the viewpoint position, line of sight direction, and focal position, for example. Also, a plurality of pieces of TimedMetadata may be defined. For example, when a plurality of objects to which the user should pay attention (persons and the like) are present in the virtual viewpoint video data, TimedMetadata may be defined for each person.

Hardware Configurations of Apparatuses

Next, exemplary hardware configurations of the client 101 and the server 102 will be described using FIGS. 4A and 4B.

Figure 4A:
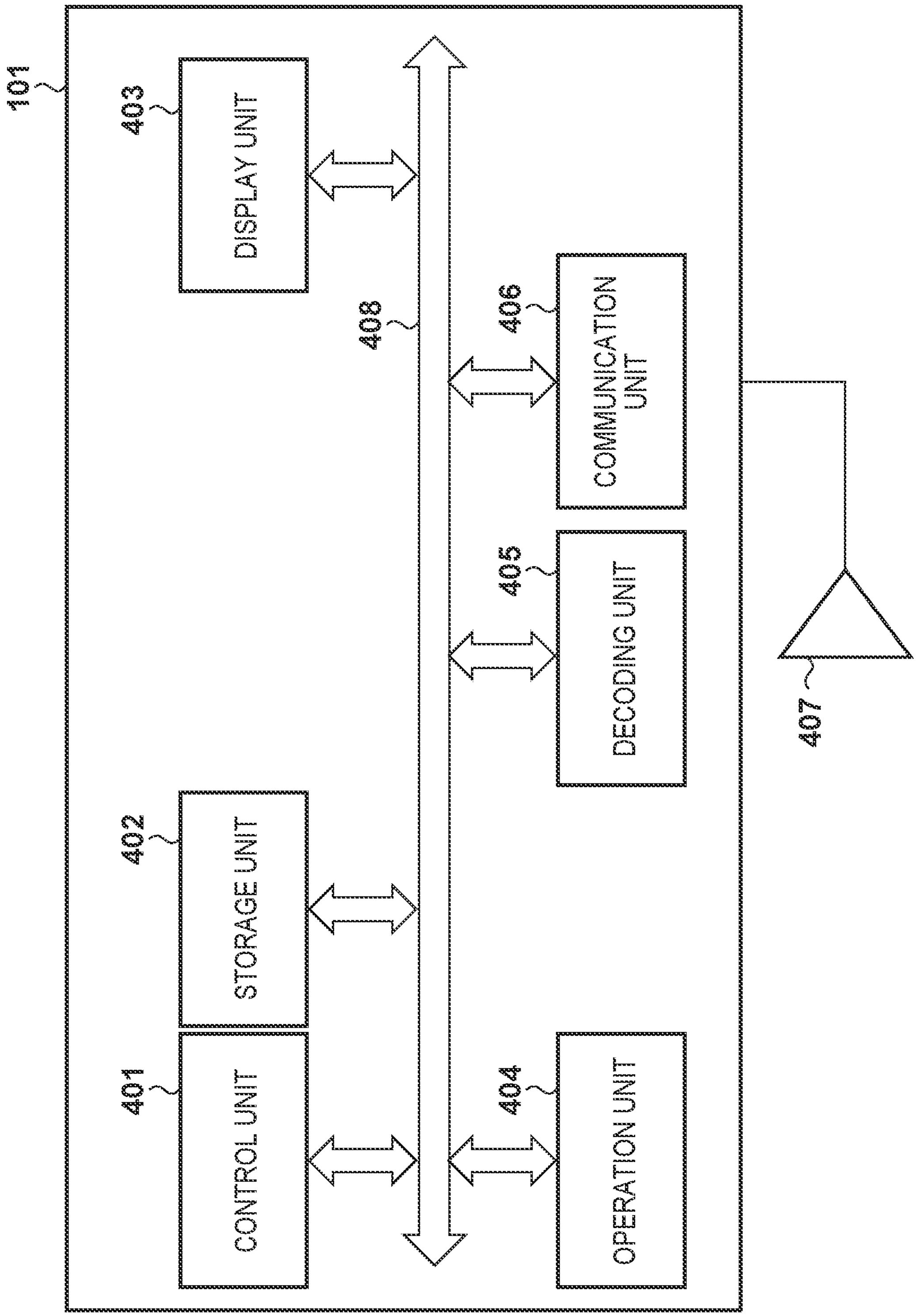
FIG. 4A is a block diagram illustrating an exemplary hardware configuration of a client.

FIG. 4A is a diagram illustrating an exemplary hardware configuration of the client 101. The client 101 includes a control unit 401, a storage unit 402, a display unit 403, an operation unit 404, a decoding unit 405, a communication unit 406, a communication interface 407, and a system bus 408, for example.

The control unit 401 integrally controls the operations in the client 101 by controlling the other constituent units through the system bus 408, for example. The control unit 401 may be one or more processors such as a CPU (central processing unit), an ASIC (application-specific integrated circuit), an FPGA (field programmable gate array), and a DSP (digital signal processor). The storage unit 402 stores and manages various types of data. The storage unit 402 may be a memory such as an SRAM (Static RAM) or a DRAM (Dynamic RAM) or a mass storage such as a hard disk drive, for example. The display unit 403 is, for example, a liquid crystal panel that is configured to perform various types of display under the control of the control unit 401. The operation unit 404 is a user interface such as a key and a button that accepts an operation made by the user. Note that the display unit 403 and the operation unit 404 may be configured as one apparatus using a touch panel, for example. The decoding unit 405 performs decoding processing on video data. Note that the decoding unit 405 may be constituted by a dedicated circuit, or the like, but the configuration may also be such that the decoding of an obtained video is performed by the control unit 401 executing a program stored in the storage unit 402, for example. The communication unit 406 executes various types of communication processing via the communication interface 407, for example. The communication unit 406 is constituted by a communication circuit such as a modulation/demodulation circuit, for example. The communication interface 407 is an interface for wired communication through the Ethernet, or the like, or for wireless communication through a public wireless communication network such as a wireless LAN or the Bluetooth (registered trademark), for example. For example, when the communication interface 407 is a wireless communication interface, the communication interface 407 is constituted by an RF front end and an antenna, converts the signal generated by the communication unit 406 to a wireless signal, and transmits the wireless signal through the antenna. Also, when the communication interface 407 is a wired communication interface, the communication interface 407 may be constituted by a connector for cable connection, a photoelectric conversion unit, and the like, for example. Any unit or circuit can be used as the communication unit 406 and the communication interface 407 as long as communication is possible with another apparatus such as the server 102. Also, the client 101 may include a plurality of communication interfaces.

Note that, in the present embodiment, the display unit 403 is illustrated as one constituent element of the client 101, but an external display apparatus such as a display or a television that is connected through HDMI (registered trademark), or the like, may be used, for example. In such a case, the client 101 may include a display control unit, for example. Also, the operation unit 404 may be an apparatus that detects operations regarding the viewpoint/line of sight/focal point made by a user such as an HMD, or may function as an operation accepting unit that is connected to an external joystick, keyboard, or mouse, and accepts user operations. In this way, the display unit 403 or the operation unit 404 may be provided as a device outside the client 101, for example, and, in this case, the display unit 403 of the client 101 may be replaced by the display control unit, and the operation unit 404 may be replaced by the operation accepting unit. Also, the client 101 may include the display control unit and the operation accepting unit for allowing an external device to display information and to accept operations in addition to the internal display unit 403 and operation unit 404. Also, the other function units described above may be similarly provided as apparatuses outside the client 101, and, in this case, the client 101 is communicably connected to these apparatuses outside the client 101 and may include a function unit for inputting/outputting information.

Figure 4B:
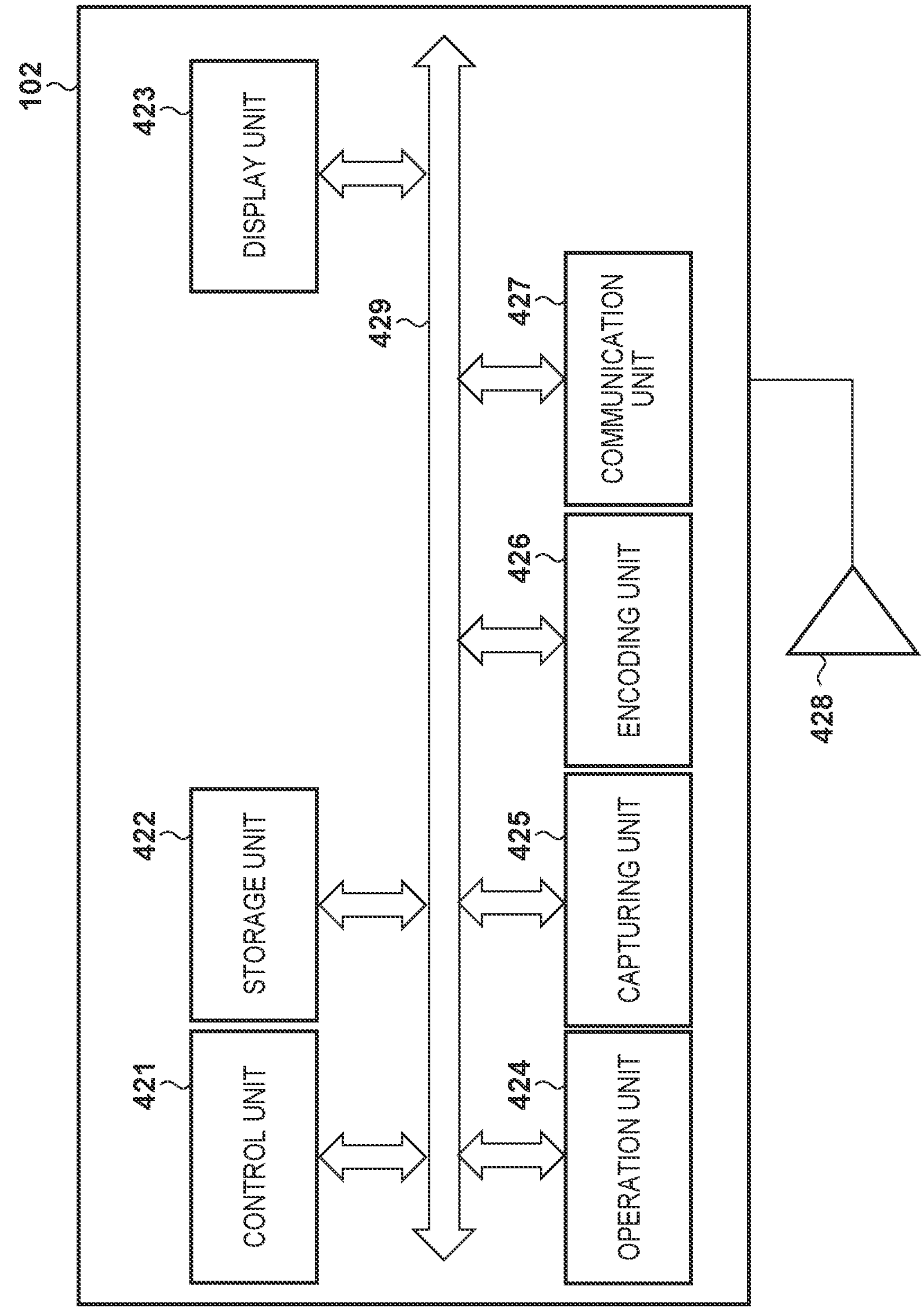
FIG. 4B is a block diagram illustrating an exemplary hardware configuration of a server.

FIG. 4B is a block diagram illustrating an exemplary hardware configuration of the server 102. The server 102 includes a control unit 421, a storage unit 422, a display unit 423, an operation unit 424, a capturing unit 425, an encoding unit 426, a communication unit 427, a communication interface 428, and a system bus 429, for example.

The control unit 421 integrally controls the operations in the server 102 by controlling the other constituent units through the system bus 429, for example. The control unit 421 may be one or more processors such as a CPU (central processing unit), an ASIC (application-specific integrated circuit), an FPGA (field programmable gate array), and a DSP (digital signal processor). The storage unit 422 stores and manages various types of data. The storage unit 422 may be a memory such as an SRAM (Static RAM) or a DRAM (Dynamic RAM) or a mass storage such as a hard disk drive, for example. The display unit 423 is, for example, a liquid crystal panel that is configured to perform various types of display under the control of the control unit 421. The operation unit 424 is a key and a button for accepting operations made by a user, for example. Note that the display unit 423 and the operation unit 424 may be configured as one apparatus using a touch panel, for example. The capturing unit 425 performs capturing of a video. The capturing unit 425 includes a lens and a sensor, for example. Note that the server 102 may obtain video data from one or more other apparatuses without capturing a video. Also, the server 102 may generate video data based on data obtained from one or more other apparatuses. Also, the server 102 may obtain video data that is generated by a first other apparatus based on data obtained from one or more second other apparatuses, from the first other apparatus. The encoding unit 426 performs encoding processing on video data. Note that the encoding unit 426 may be constituted by a dedicated circuit, or the like, but the configuration may also be such that the control unit 421 encodes a video captured by the capturing unit 425 by executing a program stored in the storage unit 422, for example. Note that the server 102 may be configured to obtain encoded video data from another apparatus without including the encoding unit 426. Also, the server 102 may grasp only the location of video data without obtaining the video data, and notify the client 101 of information regarding the location. The communication unit 427 executes various types of communication processing via the communication interface 428. The communication unit 427 is constituted by a communication circuit such as a modulation/demodulation circuit, for example. The communication interface 428 is a wired communication interface or a wireless communication interface, and has a similar configuration as the communication interface 407, for example. The server 102 may include a plurality of communication interfaces.

Functional Configuration of Client 101

Figure 5:
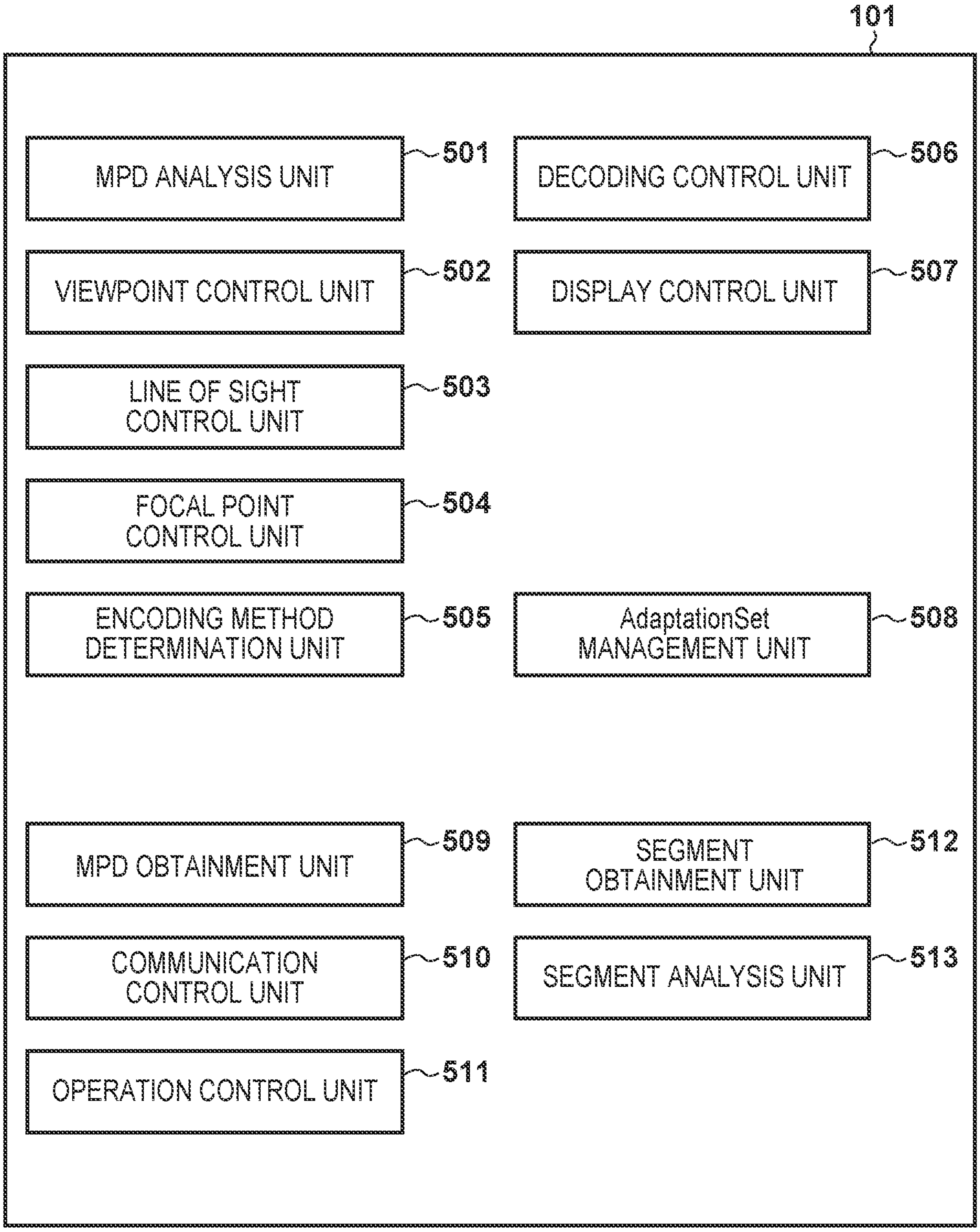
FIG. 5 is a block diagram illustrating an exemplary functional configuration of the client.

Next, the functional configuration of the client 101 will be described. FIG. 5 is a block diagram illustrating an exemplary functional configuration of the client 101. The client 101 includes an MPD analysis unit 501, a viewpoint control unit 502, a line of sight control unit 503, a focal point control unit 504, an encoding method determination unit 505, a decoding control unit 506, a display control unit 507, an MPD obtainment unit 509, and an AdaptationSet management unit 508, for example. Also, the client 101 includes a communication control unit 510, an operation control unit 511, a segment obtainment unit 512, and a segment analysis unit 513. Note that these functional blocks may be realized by a CPU (not illustrated) of the control unit 401 executing a software program stored in a memory (not illustrated). Note that some of or all of the functional blocks may be realized by hardware.

The MPD analysis unit 501 analyzes an MPD (Media Presentation Description) file, which is an MPEG-DASH play list file obtained from the server 102. In this play list, an URL (Uniform Resource Locator) for accessing a specific segment at a specific timing is described. Also, the MPD analysis unit 501 analyzes metadata to be used to obtain/reproduce virtual viewpoint video data that is described in the MPD file.

The viewpoint control unit 502 executes control relating to the viewpoint movement inside a space of a virtual viewpoint video. The viewpoint control unit 502 retains information indicating a current viewpoint position and a range in which viewpoint movement is possible in the virtual viewpoint video, and performs control such that the viewpoint position does not move to the outside of the range of the virtual viewpoint video or to an entering prohibited range. Also, when the space region is divided, the viewpoint control unit 502 retains information regarding the range in which viewpoint movement is possible in each divided space.

The line of sight control unit 503 controls the line of sight direction and the line of sight range inside the space of the virtual viewpoint video. The line of sight control unit 503 retains information regarding a current line of sight direction and line of sight range and a line of sight range in the virtual viewpoint video, and executes control such that the line of sight direction and the line of sight range will not be outside the range of the virtual viewpoint video.

The focal point control unit 504 controls the focal position inside the space of the virtual viewpoint video. The focal point control unit 504 retains information regarding a current focal position and the range, of the virtual viewpoint video, in which the focal position can be moved, and executes control such that the focal position will not move to the outside of the range of the virtual viewpoint video.

The encoding method determination unit 505 determines the encoding method with which the video data described in the MPD is encoded, and, with this, determines whether the client 101 can decode the video data. For example, the encoding method determination unit 505 determines, based on a value of codecs included in the MPD obtained by the client 101, whether the video data included in AdaptationSet or Representation corresponding to the codecs is decodable.

The decoding control unit 506 decodes the virtual viewpoint video data by controlling the decoding unit 405. Also, the decoding control unit 506 may decode, in addition to the virtual viewpoint video data, other pieces of encoded video data.

The display control unit 507 executes control of the viewpoint control unit 502, the line of sight control unit 503, and the focal point control unit 504, and control of displaying the virtual viewpoint video in the display unit 403 based on video data decoded by the decoding control unit 506. Also, the display control unit 507 may execute zoom processing including enlargement and reduction on the virtual viewpoint video.

The AdaptationSet management unit 508 manages an AdaptationSet included in the MPD and metadata included in each AdaptationSet. Also, the AdaptationSet management unit 508 manages the AdaptationSet under reproduction.

The MPD obtainment unit 509 obtains an MPD file serving as a play list from the server 102 via the communication control unit 510. The communication control unit 510 executes communication with another apparatus by controlling the communication unit 406. For example, the communication control unit 510 controls communication in accordance with various types of communication protocols such as HTTP (Hyper Text Transfer Protocol) and TCP/IP. The operation control unit 511 accepts operations made by a user by controlling the operation unit 404. The segment obtainment unit 512 obtains a segment (video data) from the server 102 via the communication control unit 510. The segment analysis unit 513 analyzes the segment obtained via the segment obtainment unit 512.

Processing Flow Executed by Client 101

Next, some examples of the processing flow to be executed by the client 101 will be described. In the present embodiment, information regarding video data is included in the MPEG-DASH MPD file, and the client 101 executes video reproduction processing based on the information. For example, when the client 101 is compatible with reproduction of a virtual viewpoint video and the information regarding the virtual viewpoint video is included in the MPD file, the client 101 reproduces the virtual viewpoint video based on the information. Also, when the client 101 is not compatible with reproduction of a virtual viewpoint video and the information regarding the virtual viewpoint video is included in the MPD file, the client 101 does not obtain the virtual viewpoint video. With this, the client 101 will not obtain a video that cannot be reproduced. Here, as a result of including, in the MPD file, information regarding video data that is not virtual viewpoint video data and can be reproduced by the client 101, the client 101 can allow viewing of the video even if the client 101 is not compatible with reproduction of a virtual viewpoint video. Also, as a result of including descriptions for various types of display control in the MPD file, detailed control of the virtual viewpoint video to be displayed can be performed.

Processing Example 1-1

First, the MPD to be used in this processing will be described using FIG. 17, and, then, an example of the processing flow to be executed by the client 101 will be described using FIGS. 6A and 6B.

FIG. 17 illustrates an MPD 1700 including a description corresponding to virtual viewpoint video data, and the MPD 1700 includes AdaptationSets 1701, 1706, and 1707, as an example. The AdaptationSet 1701 is an example of the AdaptationSet representing the virtual viewpoint video data, and includes codecs as information indicating its encoding method. In one example, if the codecs is "6dof_v_codec", it is specified that this AdaptationSet relates to virtual viewpoint video data. The AdaptationSet 1706, in which the codecs is a character string including "avc", corresponds to video data encoded by H.264/AVC. The AdaptationSet 1707, in which the codecs is a character string including "hvc", corresponds to video data encoded by H.265/HEVC. The video data corresponding to the AdaptationSet 1706 or 1707 is data obtained by encoding a video created by a creator who has created a video with the predetermined viewpoint, line of sight, and focal point. Note that, in the present embodiment, the MPD includes the AdaptationSet 1701, and need not include the AdaptationSets 1706 and 1707.

A SupplementalProperty 1702 indicates supplementary information relating to the AdaptationSet 1701. Here, the SupplementalProperty 1702 describes that the AdaptationSet 1701 is an AdaptationSet that includes virtual viewpoint video data with SchemeIdUri, as an example. The metadata of virtual viewpoint video data is described by the value of value of the SupplementalProperty 1702. Here, source is an identifier for identifying video data of the virtual viewpoint video data that is not encoded, and it is specified that the AdaptationSets having the same value of source are pieces of data obtained by encoding the same video data. x, y, z and "*_offset" (* is x, y, or z) define the range of the viewpoint of the virtual viewpoint video. For example, the range in the x direction is defined by x to x+x_offset. The ranges in the y and Z directions are similarly defined. Similarly, yaw, roll, pitch and "_offset" corresponding thereto define the range of the line of sight of the virtual viewpoint video, and depth and depth_offset define the range of the focal point of the virtual viewpoint video. Note that the metadata that can be described in value of the SupplementalProperty 1702 is not limited to those described above. Also, some of the above information need not be described. For example, the values of depth and depth_offset need not be defined by value. Also, the information relating to the viewpoint and the line of sight need not be described. For example, when at least one of the viewpoint, line of sight, and focal point is fixed, or when limitation is not imposed, the metadata can be described with such format. Also, the value of value may be described as value="source,x,y,z". In this case, the movable range of the viewpoint position of the virtual viewpoint video is defined as 0 to x, 0 to y, and 0 to z along the respective xyz axes. Also, the value of value may be described as value="source,6dof_idc". 6dof_idc is an identifier indicating whether or not the AdaptationSet 1701 is compatible with the virtual viewpoint video. For example, it may mean that, if this value is zero, the AdaptationSet 1701 includes virtual viewpoint video data, and if this value is one, the AdaptationSet 1701 does not include virtual viewpoint video data. When such an identifier is used, this identifier is defined for each of the plurality of AdaptationSets 1701, 1706, and 1707. In this case, the value of 6dof_idc in the AdaptationSet 1701 is set to one, and the value of 6dof_idc in each of the AdaptationSets 1706 and 1707 is set to zero. For example, with the combination of the same source and such an identifier, an AdaptationSet relating to a virtual viewpoint video and an AdaptationSet that is not related to a virtual viewpoint video can be defined with respect to one video data. With this, even with a client that cannot handle the encoding of virtual viewpoint video format, the opportunity of reproducing a video can be increased.

A SupplementalProperty 1703 represents respective unit movement amounts of the viewpoint, the line of sight, and the focal point of the virtual viewpoint video data, using vectors. The client 101 determines that the SupplementalProperty 1703 represents the vector of the unit movement amount of the virtual viewpoint video with the value of SchemeIdUri, and the sizes of the unit movement amount along the respective axes can be specified with the values in value. A SupplementalProperty 1704 represents the initial viewpoint position, the initial line of sight direction, and the initial focal point of virtual viewpoint video. The client 101 determines that the SupplementalProperty 1704 represents the initial viewpoint position, the initial line of sight direction, and the initial focal point of the virtual viewpoint video with the value of schemeIdUri, and can specify the setting values with the values in value. A SupplementalProperty 1705 indicates whether the virtual viewpoint video of the AdaptationSet 1701 is a monoscopic video (Monoscopic) or a stereoscopic video (Stereoscopic). The client 101 determines that the SupplementalProperty 1705 is an information element indicating a monoscopic video or a stereoscopic video with the value of schemeIdUri. Also, the client 101 specifies that the virtual viewpoint video of the AdaptationSet 1701 is a monoscopic video or a stereoscopic video with the value of value. Note that, in the example in FIG. 17, "stereo" is designated for describing that it is a stereoscopic video, but a value of "mono" may be designated in order to describe that it is a monoscopic video. Note that "stereo" and "mono" are examples for describing values, and other values such as zero (Monosocpic) and one (Stereoscopic) may be used, for example.

Also, values different from those described or character strings may be used as the values described above, and interpretations different from that described may be defined. For example, the interpretation may be defined such that the range of the viewpoint in the x axis is specified as x−x_offset to x+x_offset or x−x_offset to x using "x" and "x_offset". Also, the definition may be such that the range from x0 to x1 is specified using "x0" and "x1". That is, values and interpretation that are different from those described may be used as long as values that are referred to in the present embodiment are defined in a description file such as MPD. Also, the order of descriptions is not limited to the order illustrated in FIG. 17. For example, the range of the viewpoint position is described in the order of "x,x_offset,y,y_offset,z,z_offset", but the range may be described in a different order such as in the order of "x,y,z,x_offset,y_offset,z_offset".

Note that the SupplementalProperty may also be defined in the AdaptationSets 1706 and 1707, but the description thereof will be omitted in order to simplify the description.

Figure 6A:
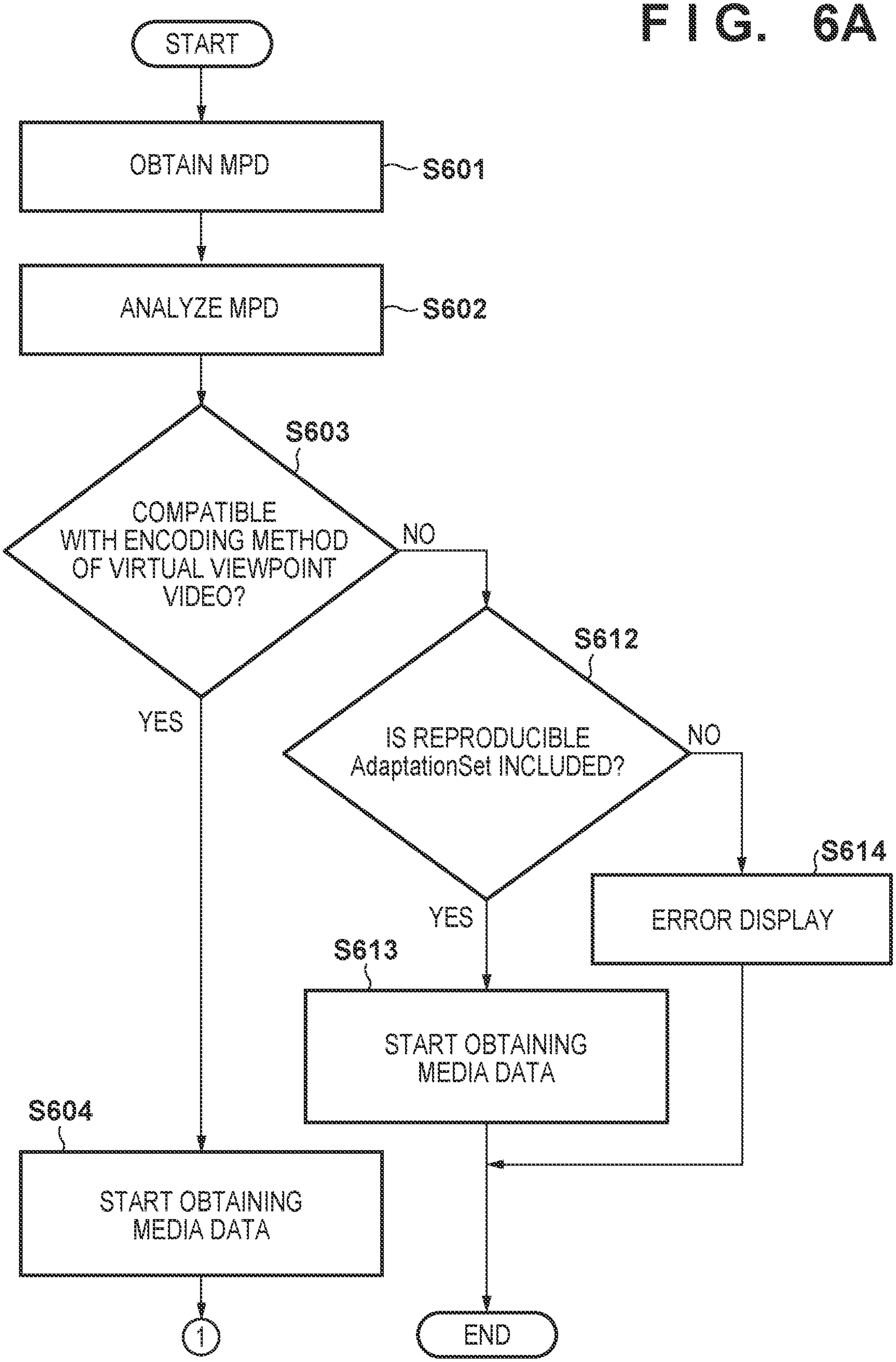
FIG. 6A is a flowchart illustrating a first example of a processing flow of the client.
Figure 6B:
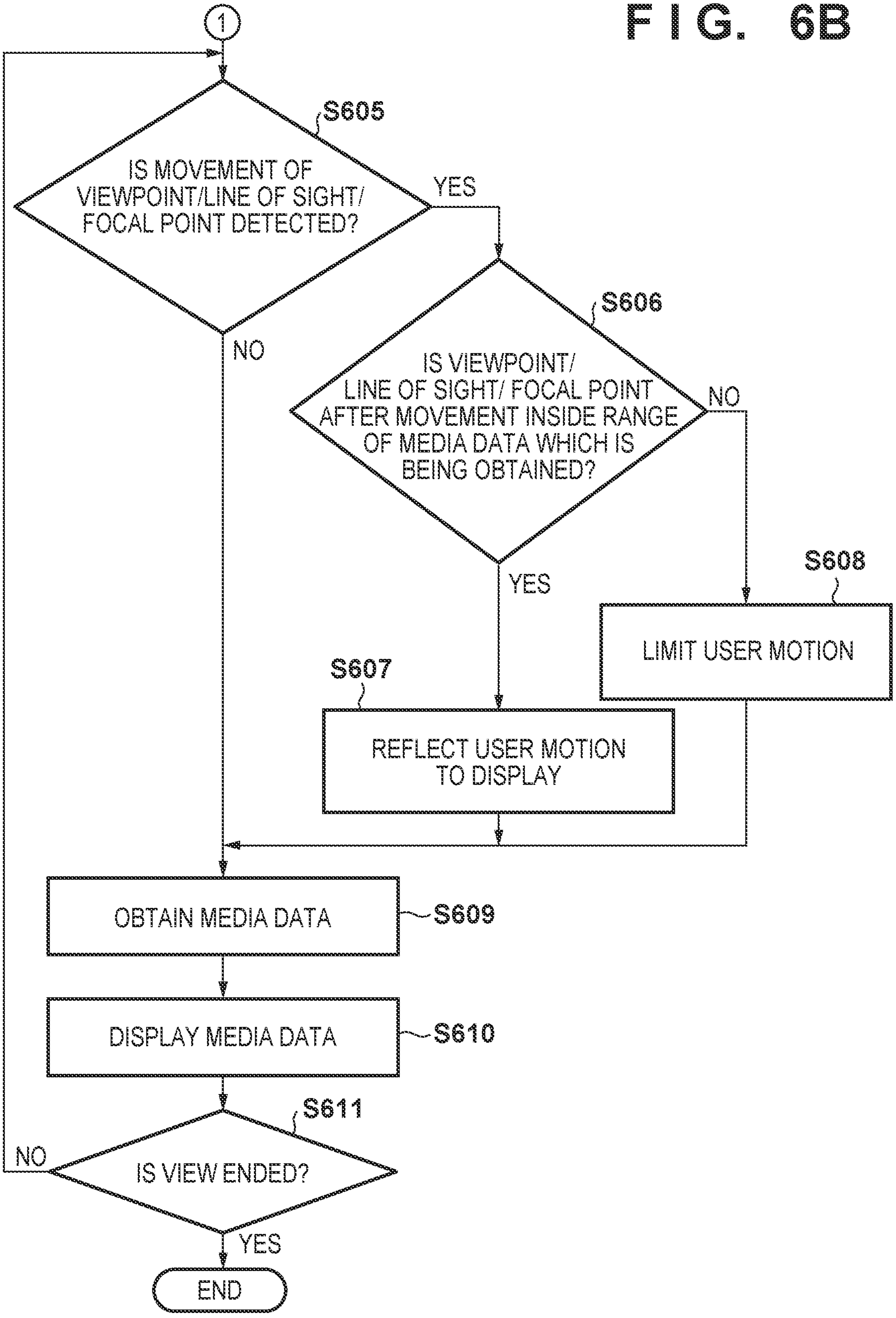
FIG. 6B is a flowchart illustrating the first example of the processing flow of the client.

In the processing in FIGS. 6A and 6B, first, the MPD obtainment unit 509 obtains an MPD file from the server 102 via the communication control unit 510 (step S601). Then, the MPD analysis unit 501 analyzes the MPD file obtained from the server 102 (step S602). In step S602, the MPD analysis unit 501 notifies the encoding method determination unit 505 of the values of codecs included in an AdaptationSet and Representation, and the encoding method determination unit 505 determines the encoding method from these values, for example. Also, the MPD analysis unit 501 may determine the encoding method by analyzing information of the SupplementalProperty included in the AdaptationSet. Also, the encoding method determination unit 505 determines whether or not virtual viewpoint video data is included in pieces of video data to be distributed by the server 102 that are described in the MPD file.

In the example in FIG. 17, the values of codecs included in the AdaptationSets 1701, 1706, and 1707 are analyzed, for example. In this case, since the value of codecs included in the AdaptationSet 1701 is "6dof_v_codec", it is determined that the AdaptationSet 1701 relates to video data encoded in a virtual viewpoint video format. Note that the value "6dof_v_codec" is an example of the value indicating that the AdaptationSet relates to video data encoded in the virtual viewpoint video format, and another value having the same meaning may be defined. On the other hand, the values of codecs included in the AdaptationSets 1706 and 1707 indicate that encoding is performed in a format that is not the virtual viewpoint video format (that is, AVC or HEVC). Therefore, the encoding method determination unit 505 determines that these AdaptationSets do not relate to a virtual viewpoint video. Note that, in the example in FIG. 17, information of the SupplementalProperty in the AdaptationSet may be analyzed, for example. In this case, whether or not the AdaptationSet 1701 relates to video data encoded in the virtual viewpoint video format is determined based on the value of schemeIdUri included in the SupplementalProperty 1702. For example, if the value of schemeIdUri is "urn:mpeg:dash:6dof", the corresponding AdaptationSet is determined to be related to video data encoded in the virtual viewpoint video format. That is, in the example in FIG. 17, the AdaptationSet 1701 may be determined to be related to video data encoded in the virtual viewpoint video format based on the value of schemeIdUri of the SupplementalProperty 1702. Note that the value "urn:mpeg:dash:6dof" is an example of the value that indicates being encoded in the virtual viewpoint video format, and another value of schemeIdUri having the same meaning may be defined.

The MPD analysis unit 501 also analyzes another metadata pertaining to the MPD. For example, the MPD analysis unit 501 analyzes metadata of resolution, bit rate, frame rate, and virtual viewpoint video data, and saves the result in the AdaptationSet management unit 508. In the example in FIG. 17, the values in value of the SupplementalProperties 1702 to 1705 relating to the AdaptationSet 1701 form the metadata relating to virtual viewpoint video data. The SupplementalProperty 1702 is metadata representing the movable range of the viewpoint position, the movable range of the line of sight direction, and the movable range of the focal position in the virtual viewpoint video data. The movable range of the viewpoint position, the movable range of the line of sight direction, and the movable range of the focal position may be set separately. The SupplementalProperty 1703 is metadata representing the movement vector value of the viewpoint position, the movement vector value of the line of sight direction, and the vector value of the focal position when the virtual viewpoint video data is viewed. The SupplementalProperty 1704 is metadata representing the initial viewpoint position, the initial viewpoint direction, the initial focal position that are recommended when the virtual viewpoint video data is viewed. The SupplementalProperty 1705 is metadata indicating that the virtual viewpoint video data is stereoscopic video data. The MPD analysis unit 501 saves the metadata of the encoding method, the resolution, the bit rate, the frame rate, and the like, included in the AdaptationSet 1701, and the metadata of the virtual viewpoint video in the AdaptationSet management unit 508. The MPD analysis unit 501 further analyzes the MPD, and saves information regarding video data that is encoded in a format other than the virtual viewpoint video format in the AdaptationSet management unit 508. For example, the AdaptationSets 1706 and 1707 related to video data encoded with AVC, HEVC, or other encoding methods and the metadata included in their AdaptationSets are saved.

The encoding method determination unit 505 determines whether an AdaptationSet relating to virtual viewpoint video data in a format that can be decoded by the client 101 is included in the AdaptationSets managed by the AdaptationSet management unit 508 (step S603). If AdaptationSet relating to virtual viewpoint video data in a format that the client 101 can decode is included (YES in step S603), the client 101 determines the virtual viewpoint video data to be obtained, and starts obtaining its media data (step S604). For example, the client 101 starts obtaining segments of video data by accessing the URL described in Representation included in an AdaptationSet corresponding to the virtual viewpoint video data. Also, here, the AdaptationSet management unit 508 manages the AdaptationSet that is currently being reproduced. If information such as the initial viewpoint position, the initial line of sight direction, and the initial focal point information is included in the MPD, the AdaptationSet management unit 508 may notify the viewpoint control unit 502, the line of sight control unit 503, and the focal point control unit 504 of the respective pieces of information. In this case, the viewpoint control unit 502, the line of sight control unit 503, and the focal point control unit 504 can respectively set the initial viewpoint position, the initial line of sight direction, and the initial focal point information based on the notified information, for example.

After starting to obtain the media data, the operation control unit 511 starts monitoring as to whether or not an operation for moving at least one of the viewpoint position, line of sight direction, and focal position has been performed (step S605). If the operation control unit 511 does not detect this movement operation (NO in step S605), the client 101 causes the processing to transition to step S609. On the other hand, if the operation control unit 511 detects that this movement operation has been performed (YES in step S605), the operation control unit 511 determines whether the viewpoint position, the line of sight direction, or the focal position after movement is included in the range of the virtual viewpoint video (step S606). The determination in step S606 is performed by comparing the values of the viewpoint position, the line of sight direction, or the focal position after movement with information indicating the range of the virtual viewpoint video data managed by the AdaptationSet management unit 508.

If the operation control unit 511 determines that the viewpoint position, the line of sight direction, or the focal position after movement is included in the range of the virtual viewpoint video (YES in step S606), the operation control unit 511 reflects the detected movement operation on the video to be displayed in the display unit 403 via the display control unit 507 (step S607). For example, if the operation to move the viewpoint position has been detected, the operation control unit 511 displays the video data on which the new viewpoint position has been reflected in the display unit 403 via the viewpoint control unit 502. Also, if the operation to move the line of sight direction has been detected, the operation control unit 511 displays the video data on which the new line of sight direction has been reflected in the display unit 403 via the line of sight control unit 503. Also, if the operation to move the focal position has been detected, the operation control unit 511 displays the video data on which the new focal position has been reflected in the display unit 403 via the focal point control unit 504.

On the other hand, if the operation control unit 511 has determined that the viewpoint position, the line of sight direction, or the focal position after movement is not included in the range of the virtual viewpoint video (NO in step S606), the operation control unit 511 imposes a limitation on the movement of the viewpoint position, the line of sight direction, or the focal position (step S608). For example, the operation control unit 511 may perform control such that the viewpoint position, the line of sight direction, or the focal position is moved to the boundary that defines the range of the virtual viewpoint video in accordance with the detected movement operation, but the movement beyond the boundary is not performed. Also, the operation control unit 511 may also disregard a movement operation that causes movement beyond the range. Also, if the movement of the viewpoint position, the line of sight direction, or the focal position includes components in a plurality of axial directions, and any of the components along the axes exceeds the defined range, the operation control unit 511 may impose a limitation only on the component along the axis, and not impose limitations on the other components along the other axes. As a result of the operation control unit 511 imposing such a limitation, it is possible to prevent a user from viewing a video outside of the viewable range of the virtual viewpoint video. With this, unexpected video data is no longer presented to the user, or at least the probability that such display is performed decreases, and as a result, the user experience can be prevented from worsening. Moreover, the movement to a range of the virtual viewpoint video that cannot be handled by the decoding control unit 506 can be limited based on the information managed by the AdaptationSet management unit 508 before the decoding processing is performed in the decoding control unit 506. With this, unexpected operations of the decoding control unit 506 and the occurrence of an error can be prevented, and the processing load can be reduced.

After executing the processing in step S607 or S608, the processing is caused to transition to step S609.

In step S609, the segment obtainment unit 512 obtains segments of video data from the server 102 via the communication control unit 510. The segment obtainment unit 512 determines the AdaptationSet corresponding to the video data to be obtained from the information managed by the AdaptationSet management unit 508, and obtains the segments by accessing the URL described in the AdaptationSet. The decoding control unit 506 decodes the virtual viewpoint video data, and causes the display unit 403 to display the decoded video data, via the display control unit 507, based on the user viewpoint position/line of sight direction/focal point information retained by the operation control unit 511 (step S610). Thereafter, the client 101 determines whether or not the reproduction of the virtual viewpoint video has ended (step S611). Then, upon determining that the reproduction of the virtual viewpoint video has ended (YES in step S611), the client 101 ends the processing, and upon determining that the reproduction of the virtual viewpoint video is not ended (NO in step S611), the client 101 returns the processing to step S605.

In step S603, if an AdaptationSet relating to virtual viewpoint video data in a format that the client 101 can decode is not included (NO in step S603), the client 101 causes the processing to transition to step S612. In step S612, the decoding control unit 506 determines whether or not video data decodable with a method other than the virtual viewpoint video encoding method is present in the AdaptationSets managed by the AdaptationSet management unit 508. For example, the decoding control unit 506 determines whether an AdaptationSet corresponding to video data encoded by a method that the client 101 can reproduce such as AVC or HEVC is managed by the AdaptationSet management unit 508. Upon determining that an AdaptationSet corresponding to video data encoded by a method that the client 101 can reproduce is not managed (NO in step S612), the client 101 causes the display unit 403 to perform error display (step S614), for example, and ends the processing. With the error display, the user is notified of the fact that the MPD of which an attempt was made to reproduce does not include data encoded by a method that can be reproduced.

On the other hand, upon determining that an AdaptationSet corresponding to video data encoded by a method that the client 101 can reproduce is managed (YES in step S612), the client 101 obtains the video data corresponding to the AdaptationSet (step S613). For example, if the client 101 is compatible with HEVC, the client 101 obtains the corresponding segments by accessing the URL described in the AdaptationSet 1707 corresponding to video data encoded by HEVC. Also, if the client 101 is not compatible with HEVC, but is compatible with AVC, the client 101 obtains the corresponding segments by accessing the URL described in the AdaptationSet 1706 corresponding to video data encoded by AVC. Accordingly, even if the client 101 is not compatible with the virtual viewpoint video encoding method, the client 101 can provide a video to the user by obtaining and reproducing video data encoded by a method with which the client 101 is compatible. With this, the reduction of user experience caused by video data not being reproduced can be prevented.

As described above, the client 101 obtains video data (media data) that the client 101 can reproduce in accordance with the MPD. That is, if the client 101 can handle reproduction of virtual viewpoint video, and the MPD includes an AdaptationSet corresponding to virtual viewpoint video data, the client 101 obtains the virtual viewpoint video data and performs reproduction of the virtual viewpoint video. With this, when the virtual viewpoint video can be reproduced, the client 101 allows the user to view a video of high presence by obtaining the virtual viewpoint video data. Note that, even if the client 101 can reproduce a virtual viewpoint video, the client 101 may reproduce a video encoded by HEVC, for example, by accepting settings configured by the user, for example. In this case, if the AdaptationSet corresponding to video data that is set to be reproduced is included in the MPD, the client 101 can reproduce the video data in accordance with the settings. Note that, if the AdaptationSet corresponding to video data that is set to be reproduced is not included in the MPD, the client 101 may obtain video data that the client 101 can reproduce based on the AdaptationSet corresponding to the video data. With this, some video is reproduced, and a situation in which no video is presented to the user can also be prevented from occurring. As described above, the client 101 can obtain video data that the client 101 can reliably reproduce by confirming the MPD.

Processing Example 1-2

Figure 7A:
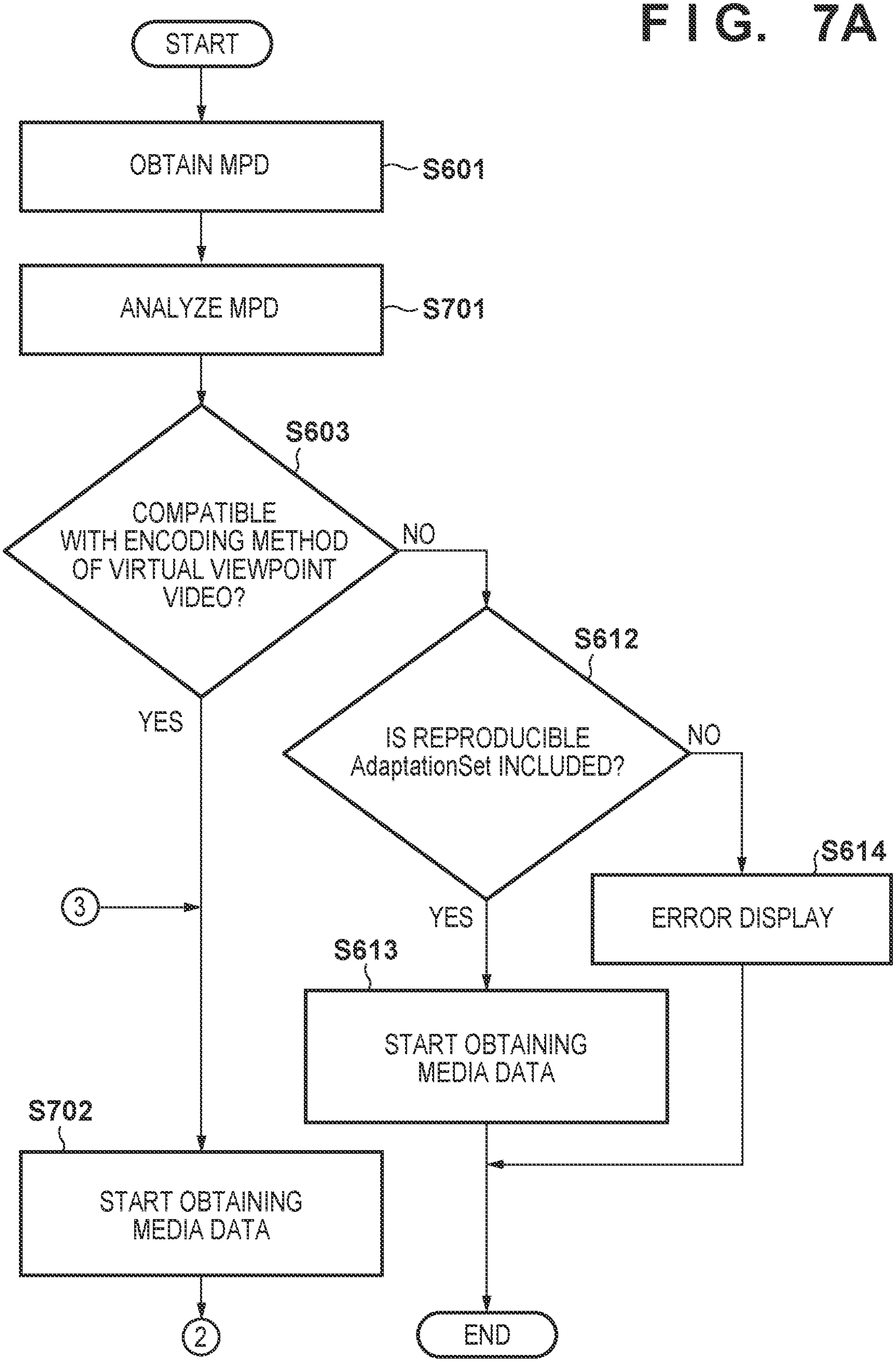
FIG. 7A is a flowchart illustrating a second example of the processing flow of the client.
Figure 7B:
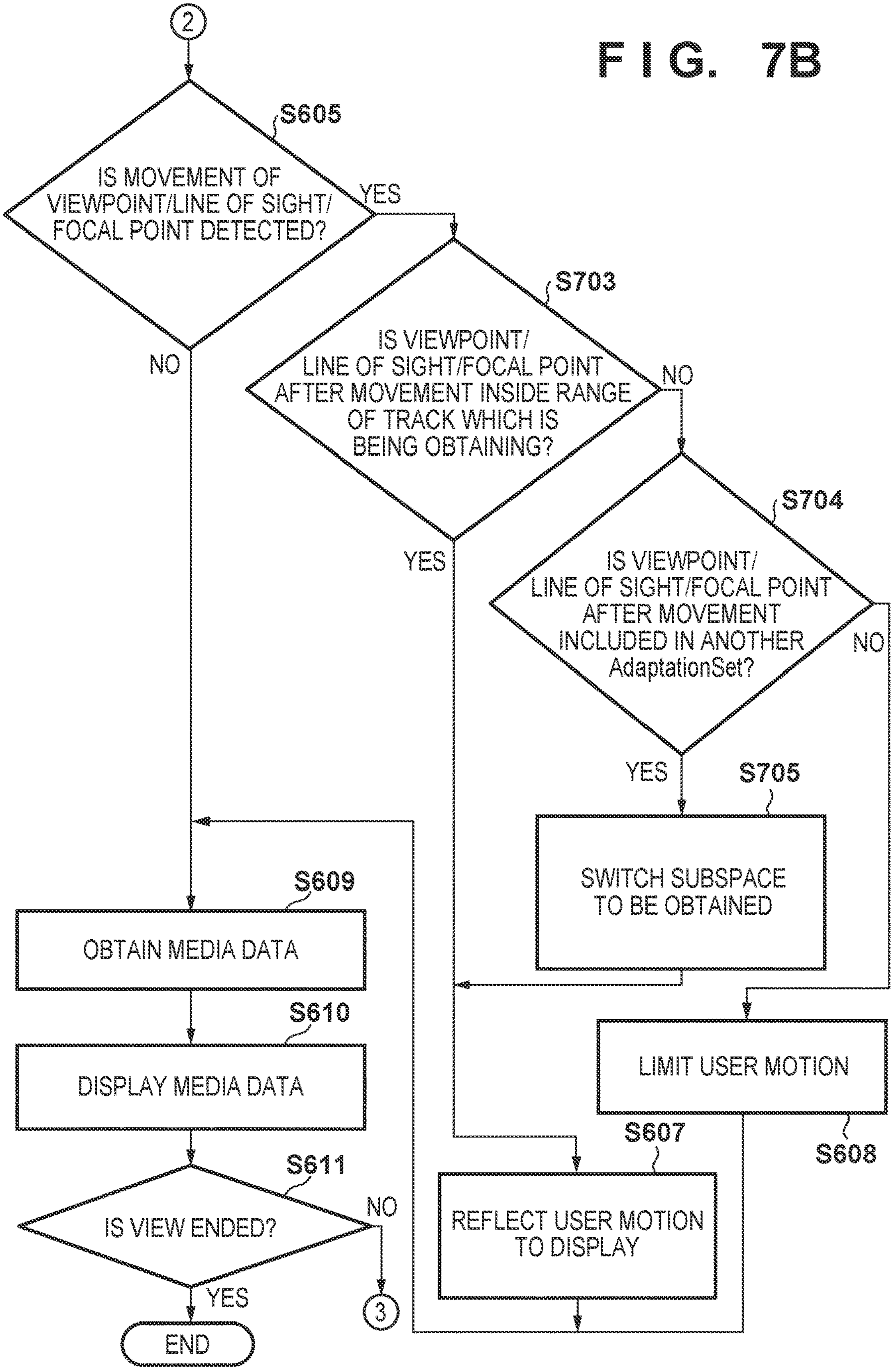
FIG. 7B is a flowchart illustrating the second example of the processing flow of the client.

FIGS. 7A and 7B show a second example of the processing flow executed by the client 101. In this processing example, an example of the case will be described where the space region of the virtual viewpoint video is divided into a plurality of regions, as illustrated in FIG. 2D. An exemplary description of the MPD used in this processing is shown in FIGS. 18A and 18B. In the following, first the MPD in FIGS. 18A and 18B will be described, and, then, the processing flow in FIGS. 7A and 7B will be described. Note that, in the processing in FIGS. 7A and 7B, the steps in which processing similar to that in the processing example 1-1 is executed are given the same reference numerals as those in FIGS. 6A and 6B, and the description thereof will be omitted.

An MPD 1800 in FIG. 18A is an MPD that describes information regarding virtual viewpoint video in which the space region is divided as illustrated in FIG. 2D. AdaptationSets 1801 and 1802 both describe information corresponding to subspaces obtained by dividing the virtual viewpoint video, and correspond to different subspaces. SupplementalProperties 1803 and 1804 describe pieces of information regarding respective subspaces obtained by dividing the virtual viewpoint video, which respectively correspond to the AdaptationSets 1801 and 1802. Here, the SupplementalProperty 1803 is similar to the SupplementalProperty 1702 in FIG. 17 except that a predetermined value is added to the value of value of the SupplementalProperty 1702, and, therefore, the description of the common items will be omitted. The added information is "total_*" and "total_*_offset", and these pieces of information indicate the total range of the virtual viewpoint video. Note that, values of x, y, and z indicating the viewpoint position, values of yaw, roll, and pitch indicating the line of sight direction, and the value of depth indicating the focal point are inserted into "*". The SupplementalProperty 1803 indicates the range of the viewpoint position of one subspace along the x axis by "x" and "x_offset", and the range of the viewpoint position of the entire space along the x axis by "total_x" and "total_x_offset". According to this information, the range from total_x to total_x+total_x_offset is specified as the range of the entire space along the x axis, for example. The ranges with respect to y, z, yaw, roll, and pitch are similarly specified. Note that the example in FIG. 18A shows an example in which all of the moving direction, line of sight direction, and focal point direction are described, but there is no limitation thereto, and some pieces of information or any combination thereof such as only the moving direction, the moving direction and the line of sight direction, or the moving direction and the focal point direction may be described.

Note that the MPD here may be described as the MPD 1810 in FIG. 18B. In the MPD 1800, the ranges of the subspace and the entire space are described by one SupplementalProperty 1803, but, in the MPD 1810, these are separately described. That is, the SupplementalProperty 1811 describes the range of the subspace, and the SupplementalProperty 1812 describes the range of the entire space. Note that, in this case, the SupplementalProperty 1811 is similar to the SupplementalProperty 1702 in FIG. 17. In the following, the case when the MPD 1800 is used will be described, but the client 101 can execute similar processing even if the MPD 1810 is used.

In FIGS. 7A and 7B, in step S701, the MPD analysis unit 501 analyzes an MPD file obtained from the server 102. The MPD analysis unit 501 analyzes space region information of the entire virtual viewpoint video data described in the MPD, and the region of the virtual viewpoint video data included in the individual AdaptationSet. The client 101 selects one of the AdaptationSets corresponding to subspaces, and starts obtaining media data corresponding to the selected AdaptationSet (step S702). Here, the AdaptationSet management unit 508 manages the AdaptationSet corresponding to the video data that is currently being reproduced. With this, the subspace in the video data that is currently being reproduced is managed. Note that the client 101 may determine the AdaptationSet that is to be first obtained based on information that specifies the initial viewpoint position, the initial line of sight direction, the initial focal point, and the like, that are described in the MPD, for example. The initial viewpoint position, the initial line of sight direction, and the initial focal point are defined as in the SupplementalProperty 1704 in FIG. 17, for example.

Upon detecting that an operation to move the viewpoint position, the line of sight direction, or the focal position has been performed (YES step S605), the operation control unit 511 determines whether the values after movement are included in the range of the subspace that is currently being reproduced, which is defined in the AdaptationSet (step S703). In this determination, the values after movement of the respective viewpoint position, line of sight direction, and focal position are compared with values of the movable range defined in the AdaptationSet corresponding to the subspace that is currently being reproduced, which is managed by the AdaptationSet management unit 508. Upon determining that the values after movement are not included in the range of the subspace that is currently being reproduced (NO in step S703), the operation control unit 511 advances the processing to step S704. In step S704, the operation control unit 511 determines whether or not the values after movement are included in a range of another subspace that is different from the subspace that is currently being reproduced, which is defined by another AdaptationSet managed in the AdaptationSet management unit 508. Then, upon determining that the values after movement are included in a range of another subspace (YES in step S704), the operation control unit 511 switches the AdaptationSet of reproduction target to the AdaptationSet related to the subspace including the values after movement (step S705). Also, the AdaptationSet management unit 508 changes the AdaptationSet that is managed as being under reproduction.

In this way, in a situation in which the virtual viewpoint video is divided into a plurality of subspaces, as a result of performing reproduction across a plurality of AdaptationSets, suitable reproduction of the virtual viewpoint video in accordance with the movement operation made by the user can be performed. Also, as a result of the virtual viewpoint video being spatially divided, the size of the video data is reduced, and the processing load in the decoding processing can be reduced.

Processing Example 1-3

Next, a third example of the processing executed by the client 101 will be described using FIGS. 8A and 8B. This processing relates to the processing when pieces of video data of an object and a background are separately provided as described with reference to FIG. 2E. An exemplary description of the MPD used in this processing is shown in FIG. 19. In the following, first, the MPD in FIG. 19 will be described, and, then, the processing flow in FIGS. 8A and 8B will be described. Note that, in the processing in FIGS. 8A and 8B, the steps in which processing similar to that in the processing example 1-1 is executed are given the same reference numerals as those in FIGS. 6A and 6B, and the description thereof will be omitted.

The MPD 1900 in FIG. 19 is an MPD that describes information regarding the background data and the object data that are used to generate the virtual viewpoint video. An AdaptationSet 1901 is an AdaptationSet relating to video data obtained by encoding a background, and AdaptationSets 1902 and 1903 are AdaptationSets relating to video data obtained by encoding objects. An EssentialProperty 1904 indicates the ranges of the viewpoint, the line of sight, and the focal point with respect to the background data of the AdaptationSet 1901. The background data is essential data when the virtual viewpoint video is generated by combining the background and the objects, and, therefore, the background data is included in the EssentialProperty. However, there is no limitation thereto, and similar information may be described in a SupplementalProperty. The client 101 can determine that this AdaptationSet 1901 corresponds to the background data from the character string "background" in a value of schemeIdUri of the EssentialProperty 1904. Also, the value of metadata relating to the background data can be obtained from the value of value. Note that the value of value has the similar meaning as that in the SupplementalProperty 1702 in FIG. 17. Note that the client 101 may determine that the AdaptationSet 1901 corresponds to the background data based on the character string "background" being included in the value of codecs.

The AdaptationSet 1902 is an AdaptationSet corresponding to an essential object, and the AdaptationSet 1903 is an AdaptationSet corresponding to an optional object. In associationType and associationID included in each of the AdaptationSets 1902 and 1903, the associated AdaptationSet and the type of association are defined. For example, as a result of the value of associationType being set to "pcbg", an association relationship in which the object is associated with the background is represented. Accordingly, because the value of associationType is "pcbg", it is indicated that the AdaptationSets 1902 and 1903 relate to objects associated with the background. Note that "pcbg" is an example of representing associationType, and another character string may be used. Also, associationID indicates AdaptationSet ID of the associated AdaptationSet. That is, because associationID is "1", it is specified that the AdaptationSets 1902 and 1903 are associated with the AdaptationSet 1901 whose AdaptationSet ID is "1".

SupplementalProperties 1905 and 1906 describe information regarding pieces of object data corresponding to the AdaptationSets 1902 and 1903, respectively. The client 101 can determine that the AdaptationSets 1902 and 1903 correspond to object data by schemeIdUri included in the SupplementalProperties 1905 and 1906. Also, the client 101 may determine whether or not the corresponding object data is essential based on the value of value included in each of the SupplementalProperties 1905 and 1906. That is, the client 101 can specify that, with respect to the AdaptationSet 1902 in which "Mandatory" is included in the value of value, corresponding object data is essential. On the other hand, the client 101 can specify that, with respect to the AdaptationSet 1903 in which "Optional" is included in the value of value, corresponding object data is optional. Note that, of the values of value, x, y, and z are information for describing the position of an object, and yaw, roll, and pitch are information for describing the rotation direction of the object.

Figure 8A:
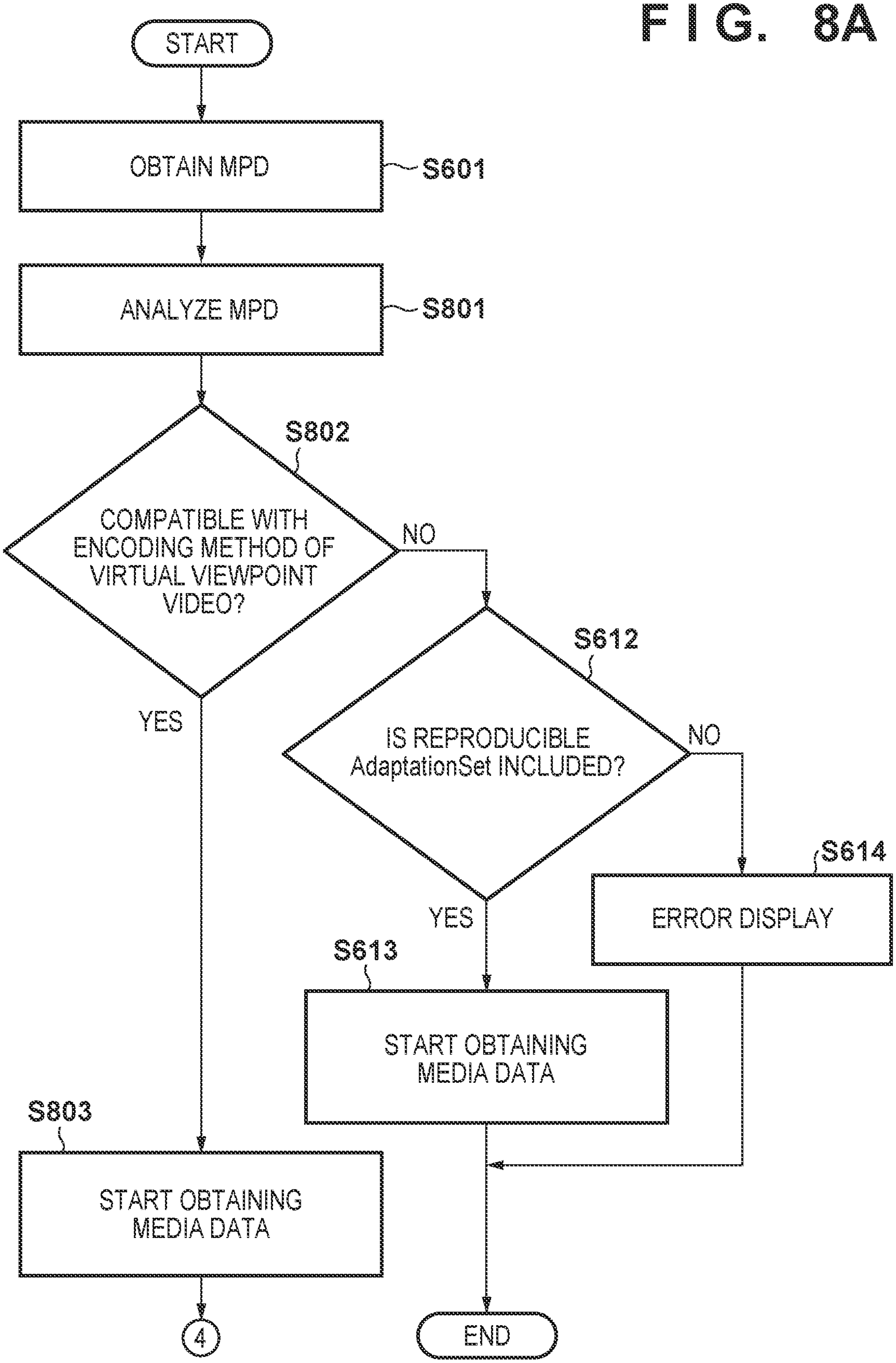
FIG. 8A is a flowchart illustrating a third example of the processing flow of the client.
Figure 8B:
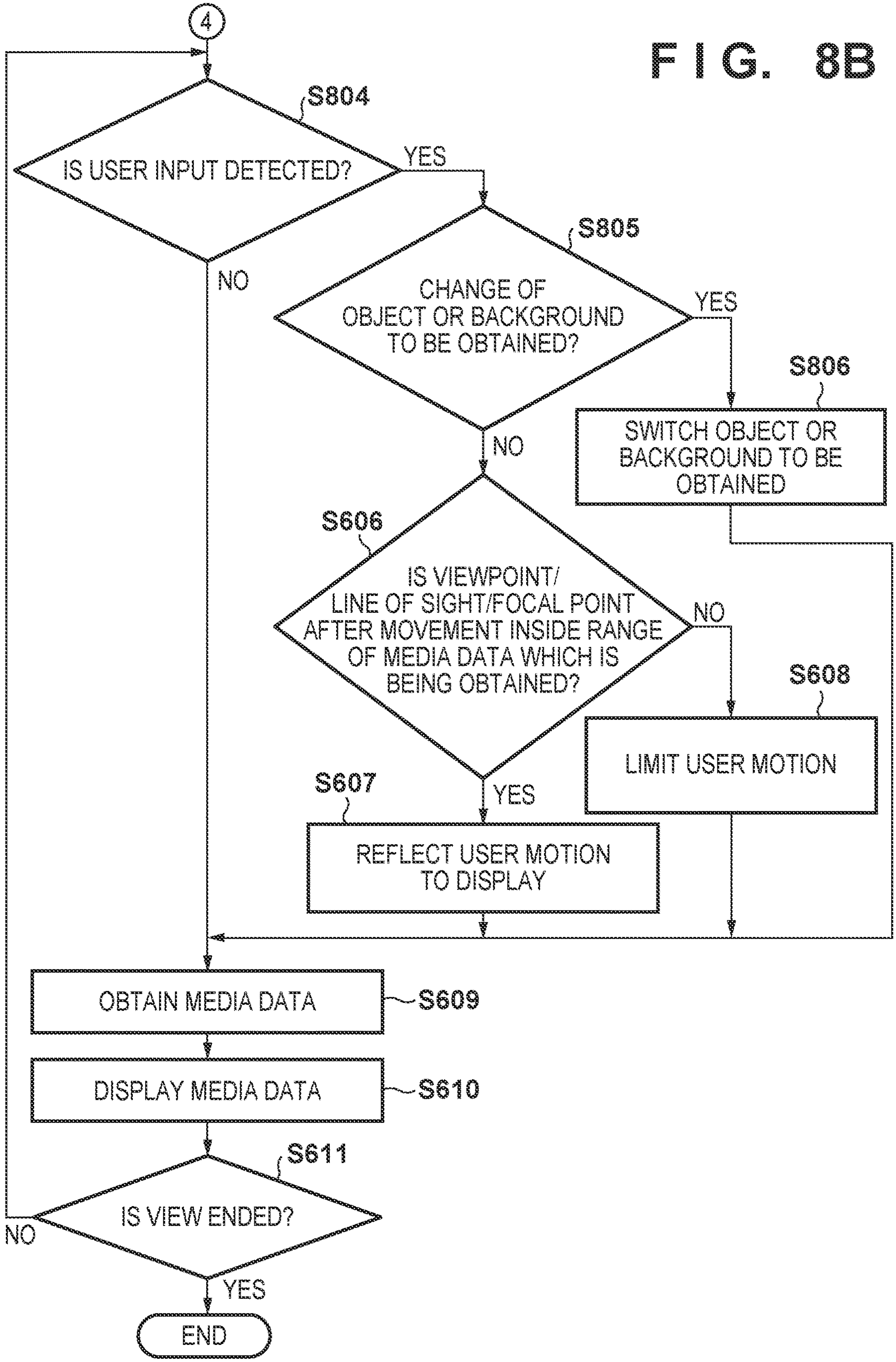
FIG. 8B is a flowchart illustrating the third example of the processing flow of the client.

In FIGS. 8A and 8B, in step S801, the MPD analysis unit 501 analyzes an MPD file obtained from the server 102. In this processing, the MPD analysis unit 501 analyzes an AdaptationSet corresponding to background data and an AdaptationSet corresponding to an object. Here, the AdaptationSet management unit 508 retains the movable ranges of the viewpoint position, line of sight direction, and focal position of an AdaptationSet corresponding to the background data. Also, the AdaptationSet management unit 508 manages a fact that this AdaptationSet is information regarding the background data. The AdaptationSet management unit 508 further manages metadata of the AdaptationSet corresponding to the object data such as the flag indicating essential or optional, the display position, and the display direction.

The encoding method determination unit 505 determines whether or not virtual viewpoint video data in a decodable format is present based on AdaptationSets managed by the AdaptationSet management unit 508 (step S802). The encoding method determination unit 505 determines that virtual viewpoint video data in a decodable format is present when the AdaptationSet management unit 508 manages AdaptationSets relating to both of decodable background data and object data. Note that the encoding method determination unit 505 may determine that virtual viewpoint video data in a decodable format is present when an AdaptationSet of object data is managed even if an AdaptationSet of background data is not managed. Upon determining that virtual viewpoint video data in a decodable format is present (YES in step S802), the client 101 specifies the AdaptationSet to be obtained, and starts obtaining media data (background data and object data) (step S803). Note that, with respect to the object data, the client 101 may obtain only the object data corresponding to an AdaptationSet in which an essential flag is set, or may also obtain optional object data. Here, the AdaptationSet management unit 508 manages the AdaptationSets selected by the client 101, that is, the AdaptationSets respectively corresponding to the background data and object data being reproduced.

When the obtainment of the media data is started, the operation control unit 511 continuously performs monitoring as to whether or not a user input has been made regarding the change of the viewpoint position, line of sight direction, and focal position of the user, or the change of the background/object to be displayed (obtained) (step S804). Then, upon determining that a user input has been made (YES in step S804), the operation control unit 511 determines whether or not the user input relates to a change of the background or the object to be displayed (step S805). Upon determining that the user inputs relates to a change of the background or the object (YES in step S805), the operation control unit 511 switches the AdaptationSet of the reproduction target to the AdaptationSet corresponding to the background or the object after change (step S806). Also, the AdaptationSet management unit 508 changes the AdaptationSet that is managed as being under reproduction. Also, if a background or an object of which obtainment will be ended due to user input is present, the AdaptationSet management unit 508 removes the AdaptationSet corresponding to the background or the object from the targets to be managed as being under reproduction. Also, if a background or an object that will be newly obtained due to user input is present, the AdaptationSet management unit 508 sets the AdaptationSet corresponding to the background or the object as the targets to be managed as being under reproduction.

Note that, in this processing, the decoding control unit 506 generates a virtual viewpoint video by decoding the background data and the object data based on the position/line of sight direction/focal point information of the user retained by the operation control unit 511. Also, the decoding control unit 506 causes the display unit 403 to display the generated virtual viewpoint video via the display control unit 507 (step S807).

In this way, in a system in which a virtual viewpoint video is generated from background data and object data, and is displayed, the data to be used to generate the virtual viewpoint video can be specified using the description of the AdaptationSet. With this, the client 101 that can generate a virtual viewpoint video can display a suitable virtual viewpoint video by obtaining background data and object data for generating the virtual viewpoint video.

Processing Example 1-4

Figure 9A:
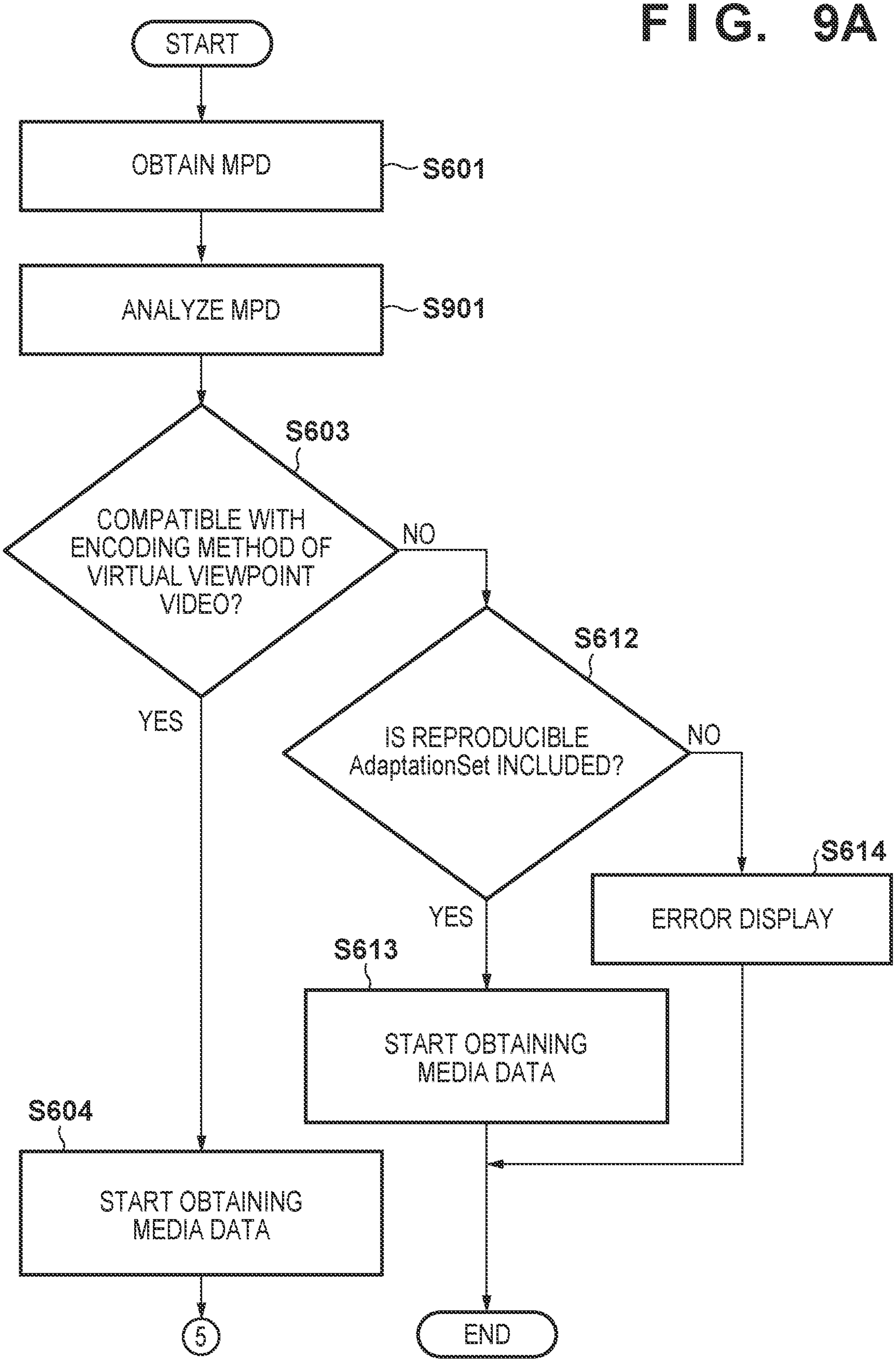
FIG. 9A is a flowchart illustrating a fourth example of the processing flow of the client.
Figure 9B:
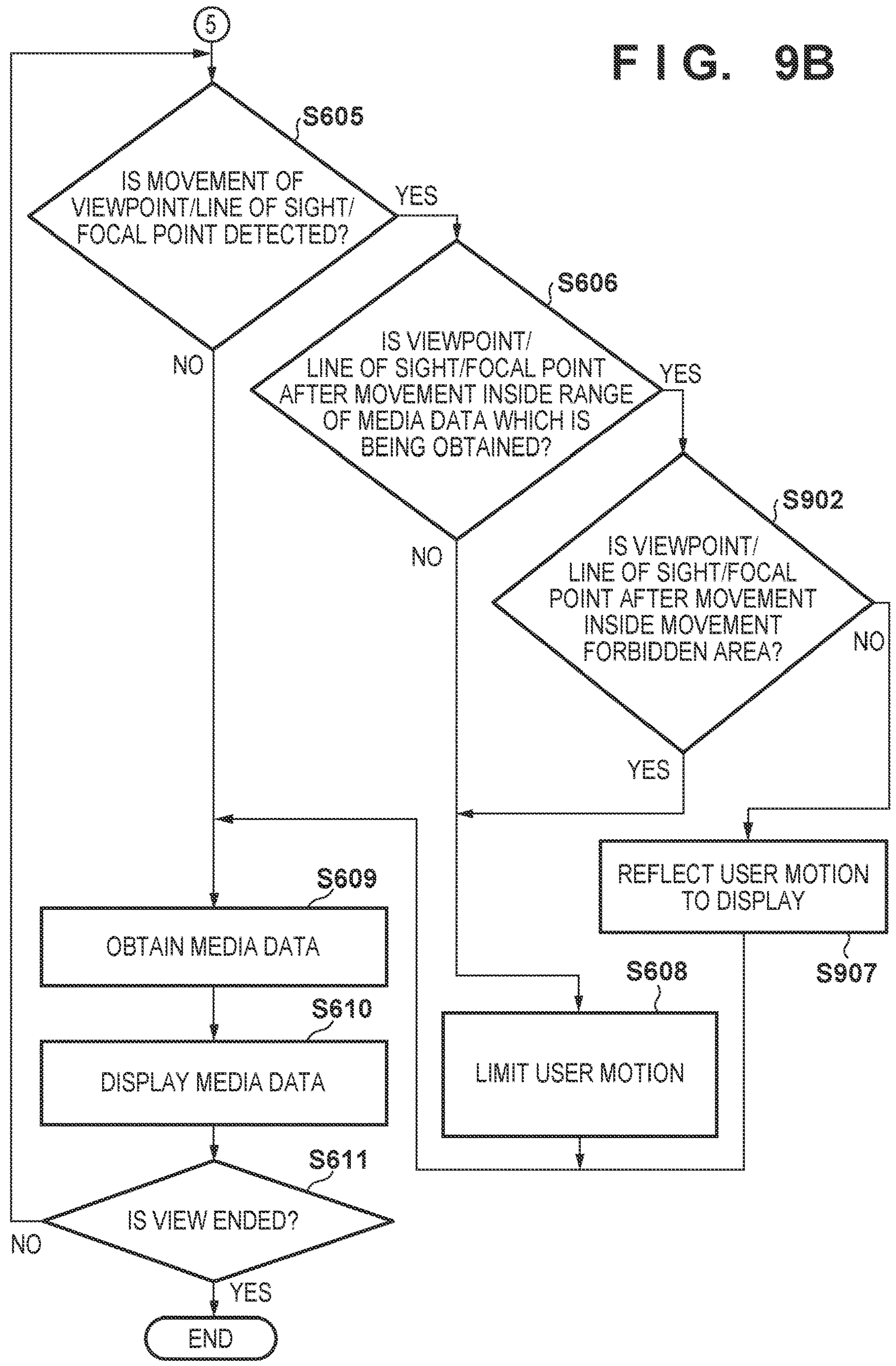
FIG. 9B is a flowchart illustrating the fourth example of the processing flow of the client.

A fourth example of the processing flow to be executed by the client 101 is shown in FIGS. 9A and 9B. This processing relates to processing when Windowed 6DoF in which movement range of the user is limited is used, as described with reference to FIG. 3A. An exemplary description of the MPD to be used in this processing is shown in FIGS. 20A and 20B. In the following, first, the MPD in FIGS. 20A and 20B will be described, and, then, the processing flow in FIGS. 9A and 9B will be described. Note that, in the processing in FIGS. 9A and 9B, the steps in which processing similar to that in the processing example 1-1 is executed are given the same reference numerals as those in FIGS. 6A and 6B, and the description thereof will be omitted.

An MPD 2000 in FIG. 20A is an MPD that describes information regarding Windowed 6DoF. Note that the MPD 2000 illustrates an example of the MPD when the movement limited ranges of the viewpoint position, line of sight direction, and focal position are stationary and do not change. A SupplementalProperty 2003 included in an AdaptationSet 2001 describes the range (movement limited range) in which the movement is limited in the virtual viewpoint video. The client 101 can determine whether or not this SupplementalProperty describes the movement limited range based on whether or not a character string "windowed_area" is included in the value of schemeIdUri, for example. That is, the client 101 can determine that the SupplementalProperty 2003 in which the character string "windowed_area" is included in schemeIdUri describes the movement limited range. Note that the description contents in value of the SupplementalProperty 2003 have a meaning similar to the description of the SupplementalProperty 1702 in FIG. 17. That is, a value in the SupplementalProperty 2003 indicates that the movement of the viewpoint to the range determined by x to x+x_offset in the x axis, y to y+y_offset in the y axis, and z to z+z_offset in the z axis is limited, for example. The client 101 cannot move the viewpoint position, line of sight direction, and focal position into the range designated here.

An MPD 2010 in FIG. 20B is an example of the MPD when the movement limited ranges of the viewpoint position, line of sight direction, and focal position dynamically change. A SupplementalProperty 2013 describes that an AdaptationSet 2011 is an AdaptationSet of TimedMetadata including the movable range. The client 101 can determine whether or not the AdaptationSet 2011 includes a movement limited range that changes dynamically based on whether or not a character string "limited_6dof" is included in schemeIdUri. Also, with the value of value, TimedMetadata that describes the movable range is defined as a Representation 2014 of Representation id=4. An AdaptationSet 2012 is an AdaptationSet that includes TimedMetadata including the movable range. The AdaptationSet 2012 can be determined to include metadata that defines the movable range with the value of codecs in the Representation 2014.

In FIGS. 9A and 9B, in step S901, the MPD analysis unit 501 analyzes the MPD file obtained from the server 102. The MPD analysis unit 501 specifies the movable range and the movement limited range of a virtual viewpoint video from an AdaptationSet corresponding to the virtual viewpoint video data. For example, the MPD analysis unit 501 analyzes the movable ranges of the viewpoint position, line of sight direction, and focal position that are defined in the AdaptationSet. Also, the MPD analysis unit 501 analyzes the movement limited ranges of the viewpoint position, line of sight direction, and focal position that are defined in the AdaptationSet. The AdaptationSet management unit 508 retains and manages the analyzed metadata along with the AdaptationSet. Note that, in this processing example, the movement limited ranges are assumed to be static values, but are not limited thereto, and dynamic movement limited ranges may be specified. For example, the AdaptationSet 2012 including TimedMetadata associated with the AdaptationSet 2011 described in the MPD 2010 in FIG. 20B is analyzed. The client 101 may obtain the movement limited range by analyzing the segment described in the AdaptationSet 2012 including TimedMetadata.

Also, the operation control unit 511 executes determination whether or not the viewpoint position, the line of sight direction, or the focal position after movement is included in the movement limited range (step S902) in addition to the determination as to whether or not it is included in the range of the virtual viewpoint video (step S606). For example, the operation control unit 511 determines whether or not the viewpoint position, the line of sight direction, or the focal position after movement is included in the movement limited range defined by the AdaptationSet associated with the video data being reproduced. Also, if the viewpoint position, the line of sight direction, or the focal position after movement is outside the range of the virtual viewpoint video (NO in step S606) or inside the movement limited range (YES in step S902), the operation control unit 511 limits the movement (user motion) (step S608). The specific method of limiting the movement when the viewpoint position, the line of sight direction, or the focal position after movement is inside the movement limited range is similar to the method of limiting the movement when the viewpoint position, the line of sight direction, or the focal position after movement is outside the virtual viewpoint video.

In this way, the client 101 can specify the movement limited range of the virtual viewpoint video from the MPD, and can perform display control in accordance thereto. Accordingly, the virtual viewpoint video can be displayed using the appropriate viewpoint position, line of sight direction, and focal position, and the user experience can be improved.

Processing Example 1-5

Figure 10A:
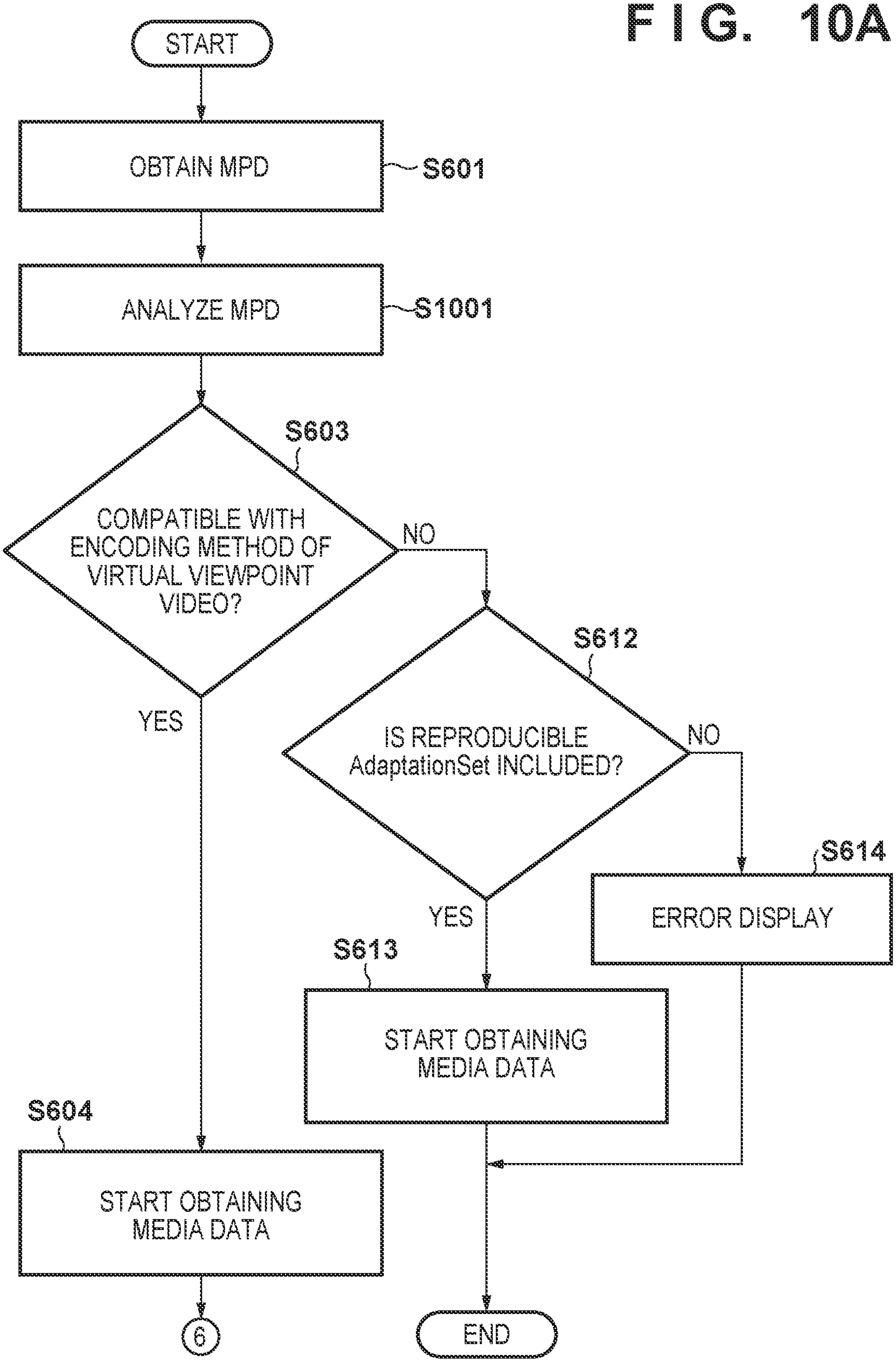
FIG. 10A is a flowchart illustrating a fifth example of the processing flow of the client.
Figure 10B:
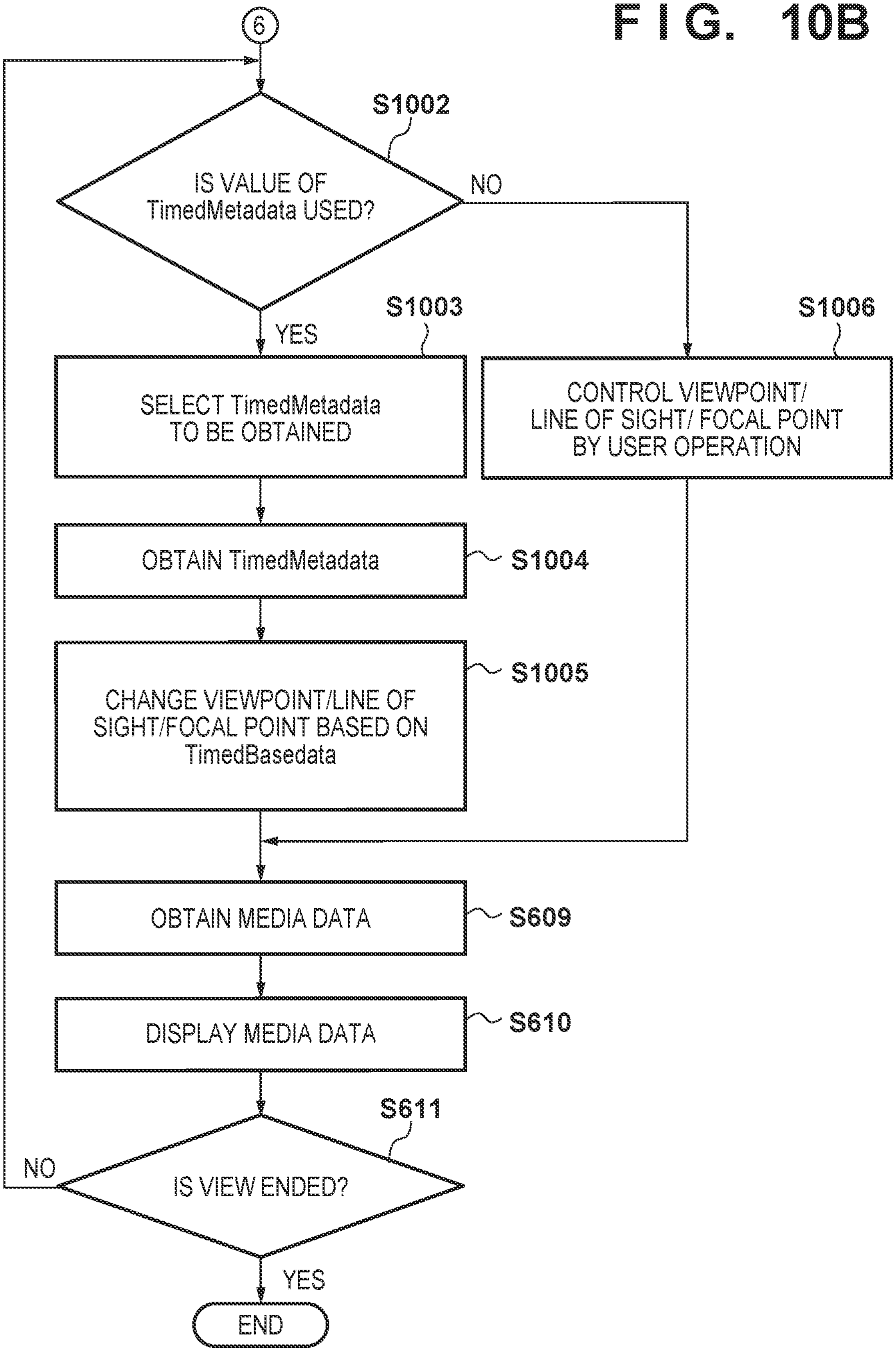
FIG. 10B is a flowchart illustrating the fifth example of the processing flow of the client.

A fifth example of the processing flow to be executed by the client 101 is shown in FIGS. 10A and 10B. This processing relates to processing when the server 102 provides information of the line of sight direction and moving direction of the user in TimedMetadata, as described with respect to FIG. 3B. An exemplary description of the MPD used in this processing is shown in FIG. 21. In the following, first, the MPD in FIG. 21 will be described, and, thereafter, the processing flow in FIGS. 10A and 10B will be described. Note that, in the processing in FIGS. 10A and 10B, the steps in which processing similar to that in the processing example 1-1 is executed are given the same reference numerals as those in FIGS. 6A and 6B, and the description thereof will be omitted.

An MPD 2100 in FIG. 21 is an example of the MPD including TimedMetadata including metadata of a virtual viewpoint video. An AdaptationSet 2101 is an AdaptationSet corresponding to the virtual viewpoint video, and an AdaptationSet 2102 is an AdaptationSet including TimedMetadata for defining the viewpoint position, line of sight direction, and focal position.

A SupplementalProperty 2104 describes information for identifying a Representation of TimedMetadata to be referenced to. The client 101 determines whether or not a character string "dynamic_6dof" is included in the value of schemeIdUri. Also, the client 101 can specify, based on this determination result, whether this SupplementalProperty indicates a TimedMetadata track that defines the viewpoint position, line of sight direction, and focal position that change dynamically. In the example in FIG. 21, it is specified that the SupplementalProperty 2104 indicates a TimedMetadata track that defines the viewpoint position, line of sight direction, and focal position that change dynamically. Also, because the value of value of the SupplementalProperty 2104 is "4.5", Representations whose Representation ids are 4 and 5 are referenced.

A Representation 2105 is a Representation including the TimedMetadata. The value of codecs of this Representation 2015 is 6dcc (Six Degrees Cartesian Coordinate). With this, it is specified that the media data included in the Representation 2105 is TimedMetadata related to a virtual viewpoint video. Note that the TimedMetadata includes the viewpoint position, line of sight direction, and focal position. The client 101 may determine the viewpoint position, line of sight direction, and focal position using this TimedMetadata. Also, the client 101 may use any one or more of the viewpoint position, line of sight direction, and focal position that are defined by the TimedMetadata. With this, the client 101 can perform reproduction control so as to allow the user to view the virtual viewpoint video, in the server 102, at the viewpoint position, line of sight direction, and focal position, as intended by the content creator. Note that the value of schemeIdUri in the MPD in FIG. 21 is merely an example, and another identifier may be used. Also, metadata may be defined in the MPD with a method other than the mechanism such as the SupplementalProperty or the EssentialProperty, as long as the metadata is metadata having a meaning similar to the metadata described above.

In FIGS. 10A and 10B, in step S1001, the MPD analysis unit 501 analyzes an MPD file obtained from the server 102. Here, the MPD analysis unit 501 analyzes the AdaptationSet corresponding to the virtual viewpoint video and the AdaptationSet including TimedMetadata. Also, the MPD analysis unit 501 executes analysis with respect to the association between the AdaptationSet corresponding to the virtual viewpoint video and the AdaptationSet including the TimedMetadata. For example, the MPD analysis unit 501 analyzes the movable ranges of the viewpoint position, line of sight direction, and focal position that are included in the AdaptationSet corresponding to the virtual viewpoint video. The AdaptationSet management unit 508 manages the analysis result. The MPD analysis unit 501 analyzes whether the TimedMetadata that should be associated with the virtual viewpoint video data is present. If such TimedMetadata is present, the AdaptationSet management unit 508 manages the association between the virtual viewpoint video data and its TimedMetadata. Moreover, the MPD analysis unit 501 analyzes encoding information of TimedMetadata in the AdaptationSet including the TimedMetadata. The MPD analysis unit 501 causes the AdaptationSet management unit 508 to manage the analysis result.

The operation control unit 511, upon starting to obtain of the media data (step S604), determines whether or not the value of TimedMetadata will be used (step S1002). The operation control unit 511 may determine whether or not the TimedMetadata will be used based on the user operation indicating whether or not the TimedMetadata should be followed, for example. Note that the operation control unit 511 may determine whether or not the TimedMetadata will be used based on the viewpoint position, for example. In this case, it may be determined that the TimedMetadata will be used in a period in which the viewpoint position is in a predetermined range, for example. Also, the operation control unit 511 may determine whether or not TimedMetadata will be used based on the contract with the user, for example. For example, the configuration may be such that when the user views a virtual viewpoint video for free, the TimedMetadata is used, and when the user views the virtual viewpoint video for a charge, user selection, as to whether or not the TimedMetadata will be used, is accepted.

If the operation control unit 511 has determined that the value of TimedMetadata will be used (YES in step S1002), the AdaptationSet management unit 508 selects the TimedMetadata to be obtained (step S1003). The AdaptationSet management unit 508 may determine the TimedMetadata to be obtained based on the object in which the user is interested, for example. Here, the AdaptationSet management unit 508 may specify the object of interest based on the viewpoint position and the line of sight direction at this point in time, or may specify the object of interest based on a predetermined user operation such as selection of an object, for example. Then, the segment obtainment unit 512 obtains the TimedMetadata that is specified to be obtained (step S1004). The operation control unit 511 sets one of or all of the viewpoint position, line of sight direction, and focal position to the values designated by the TimedMetadata based on the obtained TimedMetadata (step S1005).

Note that, upon determining that the value of TimedMetadata will not be used (NO in step S1002), the operation control unit 511 controls the viewpoint position, line of sight direction, and focal position in accordance with the user operation (step S1006). For example, the operation control unit 511 may execute the processing in steps S605 to S608 in FIGS. 6A and 6B.

In this way, when a creator of the virtual viewpoint video desires to cause the user to view a virtual viewpoint video in accordance with the predetermined viewpoint position, line of sight direction, and focal position, such a setting can be described using TimedMetadata, for example. As a result, the client 101 can display the virtual viewpoint video as intended by the creator. Also, it becomes possible that some users on which limitation is imposed are allowed to view the virtual viewpoint video at a specific viewpoint position, line of sight direction, and focal position, and users on which limitation is not imposed are allowed to view the virtual viewpoint video at a free viewpoint position, line of sight direction, and focal position. Also, both of the users are allowed to view the virtual viewpoint video at a recommended viewpoint position, line of sight direction, and focal position. Note that a configuration may be adopted in which the processing in FIGS. 10A and 10B is executed when the current viewpoint position, line of sight direction, and focal position satisfy a predetermined condition, for example. That is, the client 101 may execute processing such as that shown in FIGS. 6A to 9B when the current viewpoint position, line of sight direction, and focal position do not satisfy the predetermined condition.

As in the processing examples described above, the client 101 analyzes the MPD before obtaining video data, and obtains video data that the client 101 can decode. Also, when the video data is virtual viewpoint video data, the viewpoint position, line of sight direction, and focal position when the virtual viewpoint video is reproduced by the client 101 can be limited using the description in the MPD. Accordingly, inconveniences such as the client 101 trying to decode video data that cannot be decoded, and an error due to using the viewpoint position, line of sight direction, and focal position that should not be set can be prevented from occurring.

Functional Configuration of Server 102

Figure 11:
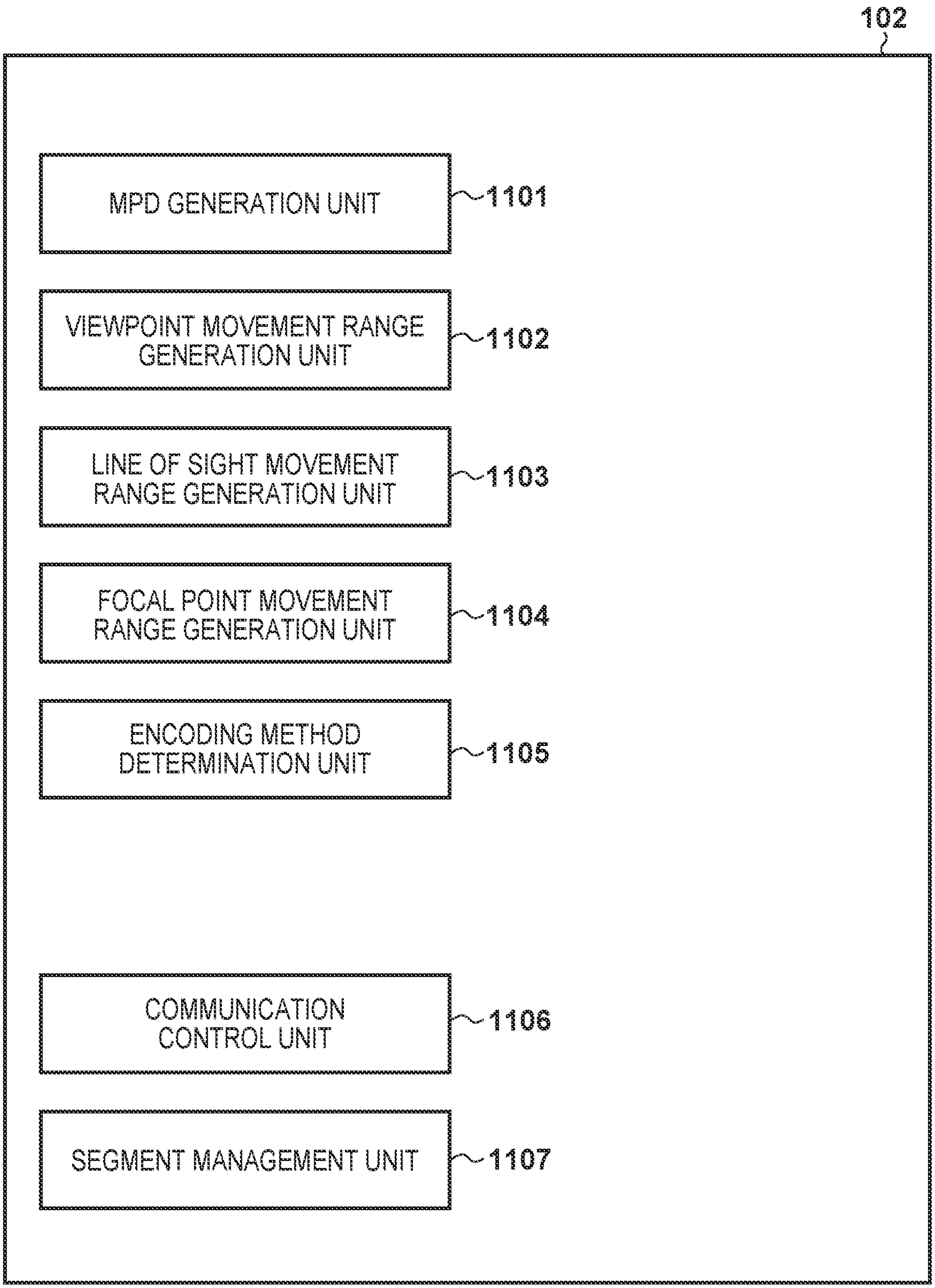
FIG. 11 is a block diagram illustrating an exemplary functional configuration of the server.

Next the functional configuration of the server 102 will be described. FIG. 11 is a block diagram illustrating an exemplary functional configuration of the server 102. The server 102 includes an MPD generation unit 1101, a viewpoint movement range generation unit 1102, a line of sight movement range generation unit 1103, a focal point movement range generation unit 1104, an encoding method determination unit 1105, a communication control unit 1106, and a segment management unit 1107, for example.

The MPD generation unit 1101 generates MPDs such as those shown in FIGS. 17 to 21 described above. The viewpoint movement range generation unit 1102 generates information regarding the movable range of the viewpoint position in a virtual viewpoint video. The viewpoint movement range generation unit 1102 obtains the movable range of the viewpoint by analyzing the virtual viewpoint video data or the container of the virtual viewpoint video data, for example. The line of sight movement range generation unit 1103 generates information regarding the movable range of the line of sight direction in the virtual viewpoint video. The line of sight movement range generation unit 1103 obtains the movable range of the line of sight by analyzing the virtual viewpoint video data or the container of the virtual viewpoint video data. The focal point movement range generation unit 1104 generates information regarding the movable range of the focal point direction in the virtual viewpoint video. The focal point movement range generation unit 1104 obtains the movable range of the focal point by analyzing the virtual viewpoint video data or the container of the virtual viewpoint video data. The pieces of information generated by the viewpoint movement range generation unit 1102, the line of sight movement range generation unit 1103, and the focal point movement range generation unit 1104 are described in the MPD by the MPD generation unit 1101. The encoding method determination unit 1105 determines the encoding method of the video data. The encoding method determination unit 1105 analyzes encoded data or the container of the encoded data and specifies whether the data is data encoded in the virtual viewpoint video format or data encoded with another encoding method, for example. Note that, with respect to data encoded with an encoding method that is not in the virtual viewpoint video format, the encoding method determination unit 1105 can specify the encoding method in detail. The information of the specified encoding method is described in the MPD by the MPD generation unit 1101.

The communication control unit 1106 controls communication via the communication unit 427. For example, the communication control unit 1106 performs control of communication with various communication protocols such as HTTP (Hyper Text Transfer Protocol) and TCP/IP. The segment management unit 1107 manages segments of video data encoded in the virtual viewpoint video format, segments of video data encoded in a format other than the virtual viewpoint video format, and segments of TimedMetadata. The segment management unit 1107 may generate segments, or may obtain segments from another apparatus.

Processing Flow Executed by Server 102

Next, some examples of the processing flow to be executed by the server 102 will be described. In the present embodiment, the server 102 includes the information regarding video data in the MPEG-DASH MPD file, and transmits the MPD file to the client 101. In the following, the processing relating to generation of the MPD file will be specifically described.

Processing Example 2-1

Figure 12:
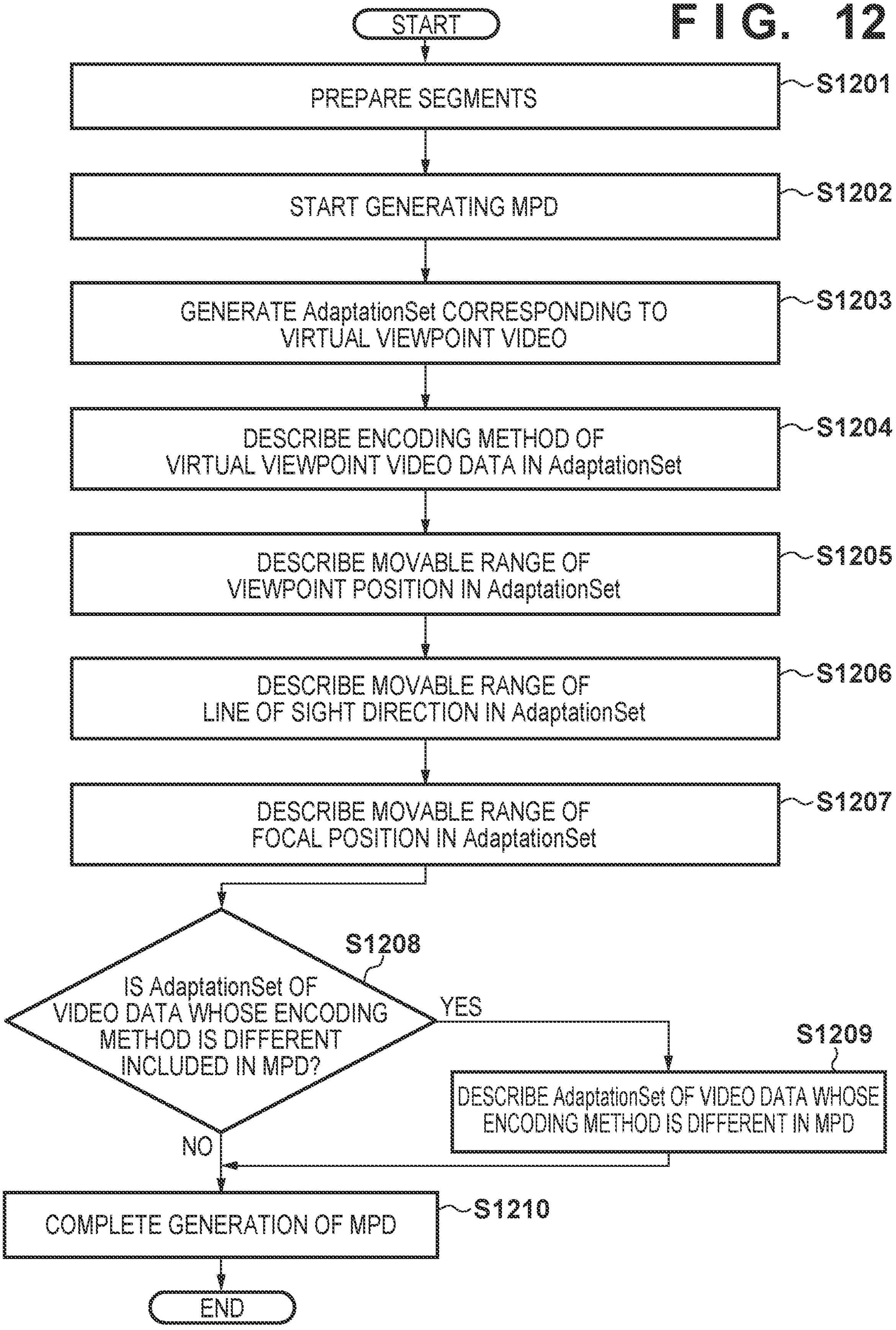
FIG. 12 is a flowchart illustrating a first example of a processing flow of the server.

This processing example is an example of the processing flow corresponding to the processing example 1-1, and relates to the processing when an MPD such as the MPD 1700 in FIG. 17 is generated. An example of this processing flow is shown in FIG. 12.

In this processing, first, the segment management unit 1107 prepares segments to be used for distribution (step S1201). The server 102 prepares an initialization segment and a media segment. Note that the segments to be distributed may be obtained by segmenting data encoded by the server 102, or may be segments generated by an apparatus other than the server 102. Note that the server 102 need not retain segments, and may prepare information regarding the location (e.g. URL) of segments retained by another apparatus. Then, the MPD generation unit 1101 starts generating the MPD (step S1202).

The MPD generation unit 1101 generates an AdaptationSet corresponding to the virtual viewpoint video (step S1203). Also, the MPD generation unit 1101 describes, in the AdaptationSet generated in step S1203, information regarding the encoding method of the corresponding virtual viewpoint video data (step S1204). For example, the MPD generation unit 1101 describes, in the AdaptationSet, the encoding method determined by the encoding method determination unit 1105 analyzing the segment file or information regarding the encoding method input from the outside. The information regarding the encoding method is described in codecs in the AdaptationSet, for example.

The MPD generation unit 1101 describes, in the AdaptationSet generated in step S1203, information regarding the movable range of the viewpoint position in the corresponding virtual viewpoint video (step S1205). For example, the MPD generation unit 1101 describes, in the AdaptationSet, the movable range of the viewpoint position determined by the viewpoint movement range generation unit 1102 analyzing the segment file or information regarding the movable range of the viewpoint position input from the outside.

Also, the MPD generation unit 1101 describes, in the AdaptationSet generated in step S1203, information regarding the movable range of the line of sight direction in the corresponding virtual viewpoint video (step S1206). For example, the MPD generation unit 1101 describes, in the AdaptationSet, the movable range of the line of sight direction determined by the line of sight movement range generation unit 1103 analyzing the segment file or information regarding the movable range of the line of sight direction input from the outside.

Also, the MPD generation unit 1101 describes, in the AdaptationSet generated in step S1203, information regarding the movable range of the focal position in the corresponding virtual viewpoint video (step S1207). For example, the MPD generation unit 1101 describes, in the AdaptationSet, the movable range of the focal position determined by the focal point movement range generation unit 1104 analyzing the segment file or information regarding the movable range of the focal position input from the outside.

Note that the processing in step S1204 to S1207 need not be executed in the order illustrated in FIG. 12, and the respective pieces of processing may be executed in any order. Also, after specifying the encoding method, the movable range of the viewpoint position, the movable range of the line of sight direction, and the movable range of the focal position as in step S1204 to S1207, generation of the AdaptationSet so as to include these pieces of information may be performed.

After completing the generation of the AdaptationSet corresponding to the virtual viewpoint video, the MPD generation unit 1101 determines whether or not an AdaptationSet relating to video data encoded with a method different from the virtual viewpoint video encoding method is to be included in the MPD (step S1208). Upon determining that an AdaptationSet corresponding to video data other than the virtual viewpoint video is to be included in the MPD (YES in step S1208), the MPD generation unit 1101 describes the AdaptationSet relating to the video data in the MPD (step S1209). For example, the MPD generation unit 1101 may include, in the MPD, an AdaptationSet corresponding to video data encoded with AVC, HEVC, or another encoding method. In this way, as a result of including, in the MPD, information regarding video data encoded with a method other than the virtual viewpoint video encoding method, there is an increased probability that a receiver of an MPD that is not compatible with the virtual viewpoint video encoding method can reproduce the contents in accordance with the MPD.

Thereafter, the MPD generation unit 1101 describes other pieces of necessary metadata in the MPD, and completes the generation of the MPD (step S1210). Note that the MPD described here is not directly related to the present embodiment, and, therefore, the description thereof will be omitted.

As a result of the MPD generated as described above being transmitted, an apparatus that has received this MPD can select and obtain video data that the apparatus can decode. For example, an apparatus that has received the MPD can, if the apparatus can decode virtual viewpoint video data, obtain the virtual viewpoint video data based on an URL included in the AdaptationSet corresponding to the virtual viewpoint video data. With this, an apparatus that has received the MPD obtains video data that has been determined to be decodable based on the MPD, and, therefore, the probability that the decoding of the obtained video data fails can be reduced.

Processing Example 2-2

Figure 13:
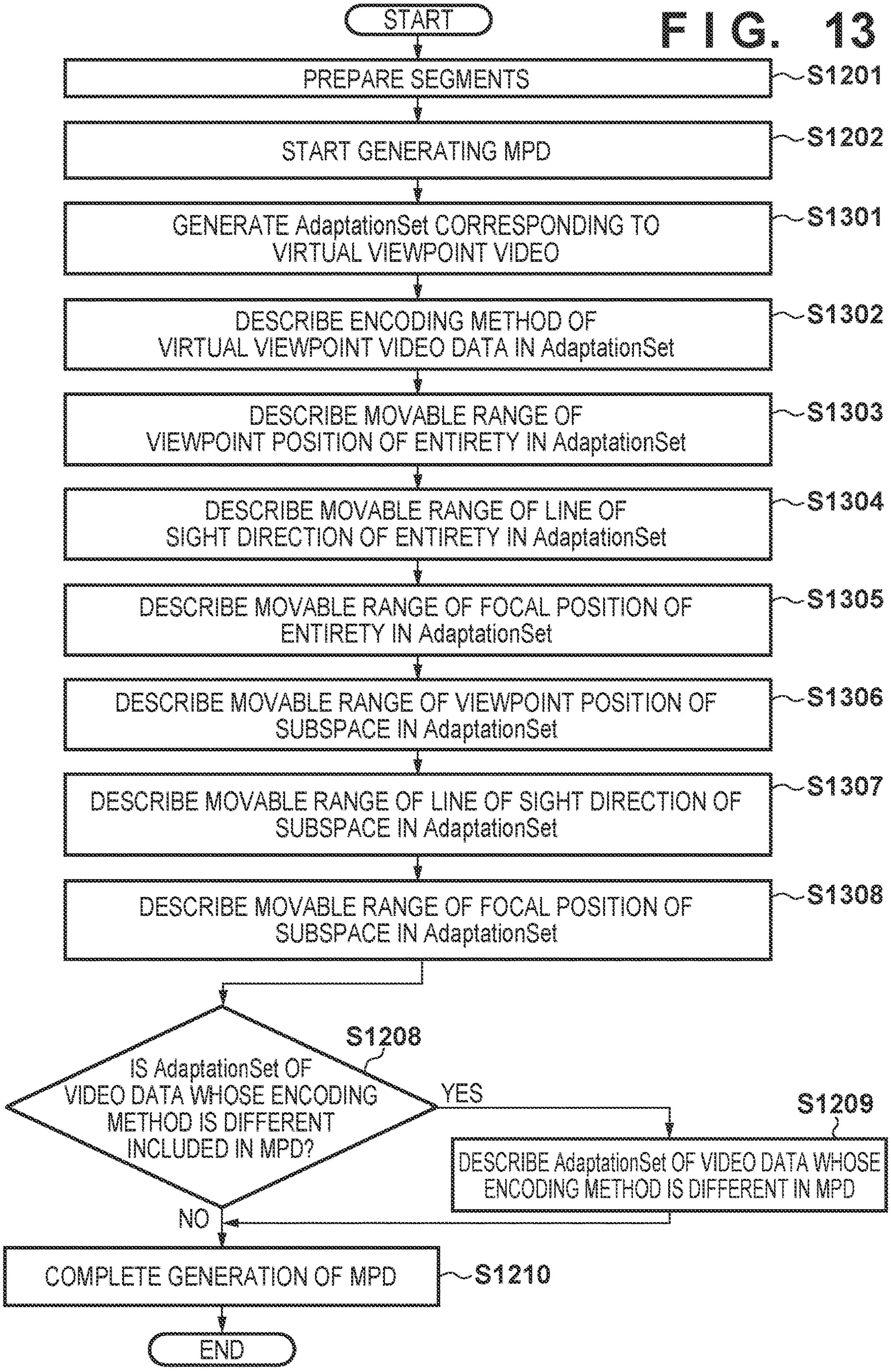
FIG. 13 is a flowchart illustrating a second example of the processing flow of the server.

This processing example is an example of the processing flow corresponding to the processing example 1-2, and relates to the processing when an MPD such as the MPD 1800 in FIG. 18A or the MPD 1810 in FIG. 18B is generated. An example of this processing flow is shown in FIG. 13. Note that, in the processing in FIG. 13, the steps in which processing similar to that in the processing example 2-1 is executed are given the same reference numerals as those in FIG. 12, and the description thereof will be omitted.

In step S1301, the MPD generation unit 1101 generates AdaptationSets respectively corresponding to a plurality of divided regions. Also, the MPD generation unit 1101 describes, in each AdaptationSet generated in step S1301, information regarding the encoding method of the virtual viewpoint video data (step S1302). The processing in step S1302 differs from the processing in step S1204 in that the processing is with respect to a subspace in the virtual viewpoint video, but the specific processing is similar to that in step S1204.

Thereafter, the MPD generation unit 1101 describes, in each AdaptationSet generated in step S1301, information regarding the movable ranges of the viewpoint position, line of sight direction, and focal position in the entirety of the virtual viewpoint video (virtual viewpoint video before division) (steps S1303 to S1305). Note that only one piece of information regarding the movable ranges of the viewpoint position, line of sight direction, and focal position with respect to the entirety of the virtual viewpoint video may be described in the MPD. In this case, for example, an AdaptationSet in which the information regarding the movable ranges of the viewpoint position, line of sight direction, and focal position with respect to the entirety of the virtual viewpoint video is described may be generated. Also, in the AdaptationSets generated in step S1301, a pointer to the AdaptationSet in which information regarding the viewpoint position, line of sight direction, and focal position with respect to the entirety of the virtual viewpoint video is described may be included. Note that the viewpoint movement range generation unit 1102, the line of sight movement range generation unit 1103, and the focal point movement range generation unit 1104 may specify the movable ranges of the viewpoint position, line of sight direction, and focal position with respect to the entirety of the virtual viewpoint video by analyzing the segments relating to all of the subspaces of the virtual viewpoint video. Also, the viewpoint movement range generation unit 1102, the line of sight movement range generation unit 1103, and the focal point movement range generation unit 1104 may obtain the information regarding the movable ranges of the viewpoint position, line of sight direction, and focal position with respect to the entirety of the virtual viewpoint video from an external apparatus.

Moreover, the MPD generation unit 1101 describes, in the respective AdaptationSets generated in step S1301, information regarding the movable ranges of the viewpoint position, line of sight direction, and focal position with respect to respective subspaces of the virtual viewpoint video respectively corresponding to the AdaptationSets (steps S1306 to S1308). Note that the viewpoint movement range generation unit 1102, the line of sight movement range generation unit 1103, and the focal point movement range generation unit 1104 may specify, by analyzing a segment relating to each subspace of the virtual viewpoint video, the movable ranges of the viewpoint position, line of sight direction, and focal position with respect to the subspace. The viewpoint movement range generation unit 1102, the line of sight movement range generation unit 1103, and the focal point movement range generation unit 1104 may obtain the movable ranges of the viewpoint position, line of sight direction, and focal position with respect to each subspace from an external apparatus.

Note that the processing in steps S1302 to S1308 need not be executed in the order illustrated in FIG. 13, and the respective pieces of processing may be executed in any order. Also, after specifying the encoding method, the movable range of the viewpoint position, the movable range of the line of sight direction, and the movable range of the focal position as in step S1302 to S1308, generation of the AdaptationSet so as to include these pieces of information may be performed.

In this way, in a situation in which the virtual viewpoint video is divided into a plurality of subspaces, as a result of describing pieces of information regarding the respective subspaces with a plurality of AdaptationSets, the apparatus that has received the MPD no longer needs to obtain the virtual viewpoint video with respect to the entire space at once. With this, since the virtual viewpoint video is spatially divided, the size of the video data decreases, and as a result, the processing load of the decoding processing in the apparatus that has received the MPD can be reduced.

Processing Example 2-3

Figure 14:
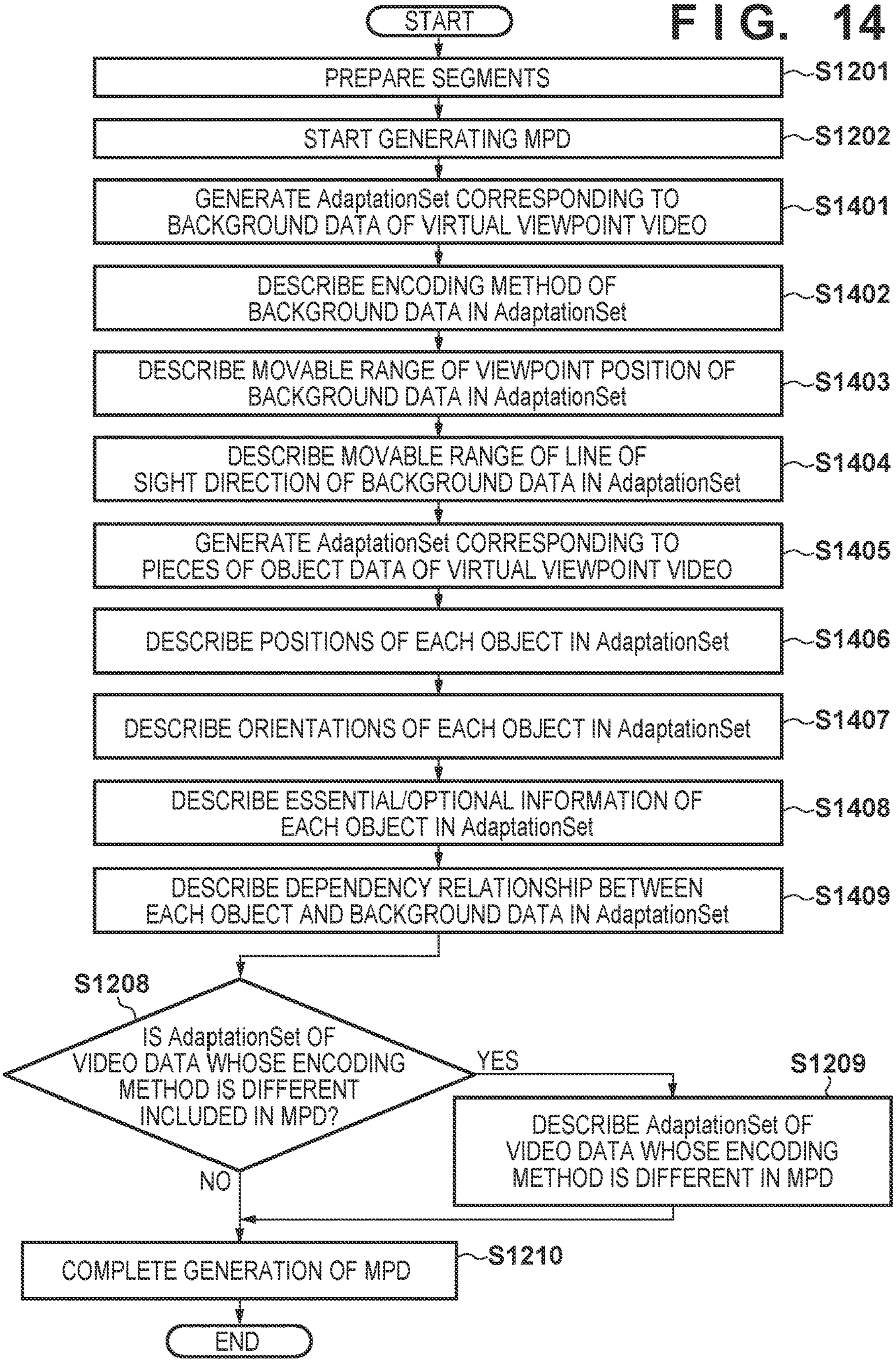
FIG. 14 is a flowchart illustrating a third example of the processing flow of the server.

This processing example is an example of the processing flow corresponding to the processing example 1-3, and relates to the processing when an MPD such as the MPD 1900 in FIG. 19 is generated. An example of this processing flow is shown in FIG. 14. Note that, in the processing in FIG. 14, the steps in which processing similar to that in the processing example 2-1 is executed are given the same reference numerals as those in FIG. 12, and the description thereof will be omitted.

In step S1401, the MPD generation unit 1101 generates an AdaptationSet corresponding to background data of the virtual viewpoint video. Also, the MPD generation unit 1101 describes, in the AdaptationSet generated in step S1401, information regarding the corresponding encoding method of the background data (step S1402). The processing in step S1402 differs from the processing in S1204 in that the processing is with respect to the background data in the virtual viewpoint video, but the specific processing is similar to that in step S1204.

Thereafter, the MPD generation unit 1101 describes, in the AdaptationSet generated in step S1401, information regarding the movable ranges of the viewpoint position and line of sight direction in the background data (steps S1403 to S1404). The processing in steps S1403 to S1404 differs from the processing in steps S1205 to S1206 in that the processing is with respect to the background data in the virtual viewpoint video, but the specific processing is similar to that in steps S1205 to S1206.

Also, the MPD generation unit 1101 generates AdaptationSets respectively corresponding to the pieces of object data of the virtual viewpoint video (step S1405). Also, the MPD generation unit 1101 describes, in the AdaptationSets generated in step S1405, information indicating the positions of objects in the virtual viewpoint video space with respect to the respective pieces of object data (step S1406). The MPD generation unit 1101 may obtain the positions of the objects by analyzing a segment file or by receiving an input from the outside, for example. Also, the MPD generation unit 1101 describes, in the AdaptationSets generated in step S1405, information indicating the orientations of the objects in the virtual viewpoint video space with respect to the respective pieces of object data (step S1407). The MPD generation unit 1101 may obtain the orientations of the objects by analyzing the segment file or by receiving an input from the outside, for example. Also, the MPD generation unit 1101 describes, in the AdaptationSets corresponding to the respective pieces of object data, information for causing a receiver of the MPD to determine whether each object is essential or optional when generating the virtual viewpoint video (step S1408). Moreover, the MPD generation unit 1101 describes, in the AdaptationSets generated in step S1405, information indicating, with respect to the respective pieces of object data, that there is a relationship in which the object data is dependent on the AdaptationSet corresponding to the background data (step S1409).

Note that the processing in steps S1401 to S1409 need not be executed in the order illustrated in FIG. 14, and the respective pieces of processing may be executed in any order. For example, generation of the AdaptationSet relating to the object data may be started prior to the generation of the AdaptationSet relating to the background data. Note that, once the AdaptationSet relating to the background data is generated, the identification information thereof may be included in the AdaptationSet relating to the object data as information regarding the dependency relationship.

In this way, in a system in which the virtual viewpoint video is generated from background data and object data, an MPD that makes it possible to specify data to be used to generate a virtual viewpoint video can be generated. With this, the virtual viewpoint video can be generated, and the apparatus that has received the MPD can display an appropriate virtual viewpoint video by obtaining the background data and the object data for generating the virtual viewpoint video.

Processing Example 2-4

Figure 15:
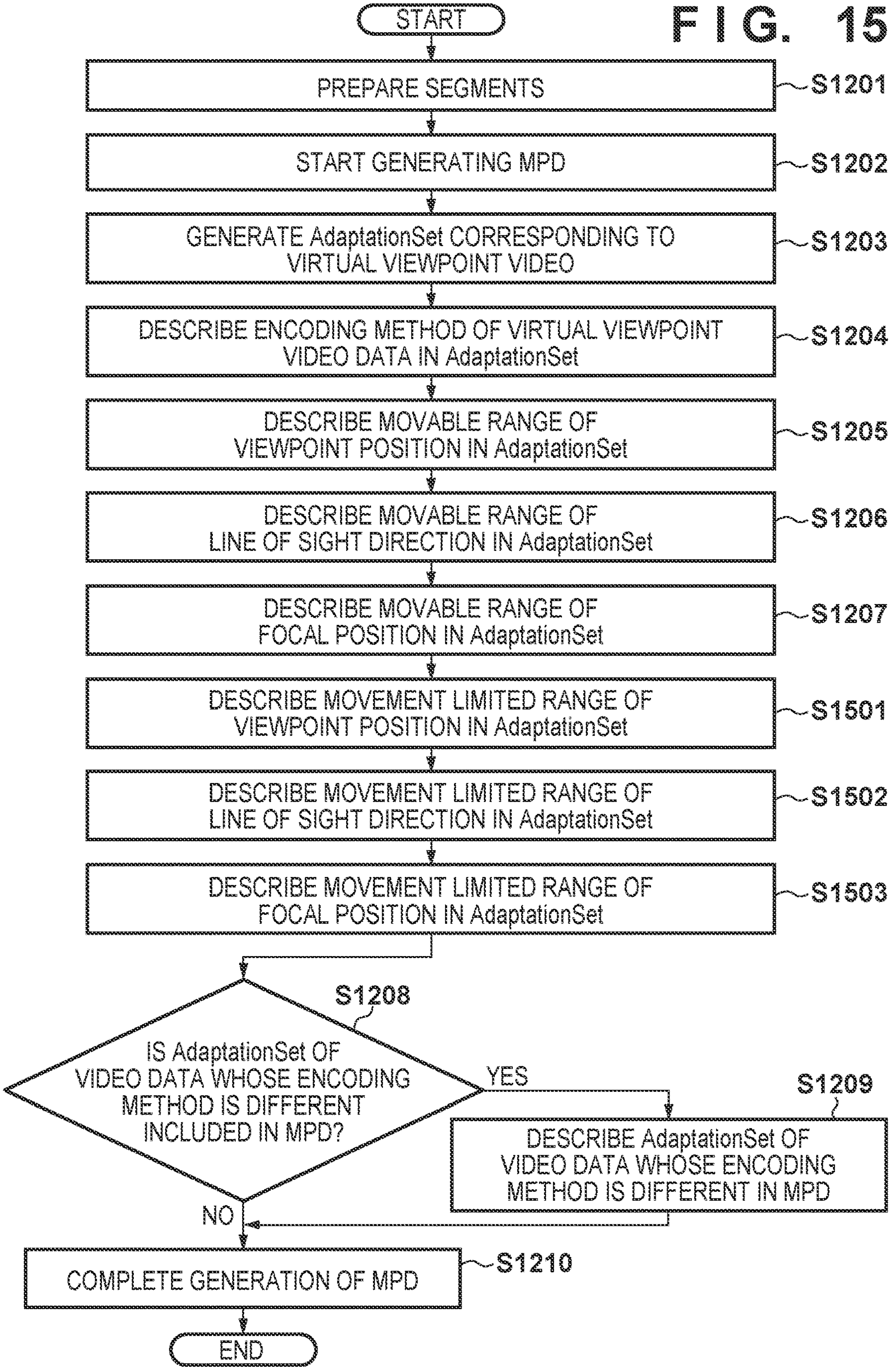
FIG. 15 is a flowchart illustrating a fourth example of the processing flow of the server.

This processing example is an example of the processing flow corresponding to the processing example 1-4, and relates to the processing when an MPD such as the MPD 2000 in FIG. 20A is generated. An example of this processing flow is shown in FIG. 15. Note that, in the processing in FIG. 15, the steps in which processing similar to that in the processing example 2-1 is executed are given the same reference numerals as those in FIG. 12, and the description thereof will be omitted.

In step S1501, the MPD generation unit 1101 describes, in the AdaptationSet, information regarding the movement limited range of the viewpoint position in a virtual viewpoint video. The MPD generation unit 1101 describes, in the AdaptationSet, information regarding the movement limited range of the viewpoint position that the viewpoint movement range generation unit 1102 has obtained by analyzing the segment file or by receiving an input from the outside. Also, the MPD generation unit 1101 describes, in the AdaptationSet, information regarding the movement limited range of the line of sight direction in the virtual viewpoint video (step S1502). The MPD generation unit 1101 describes, in the AdaptationSet, information regarding the movement limited range of the line of sight direction that the line of sight movement range generation unit 1103 has obtained by analyzing the segment file or by receiving an input from the outside. Moreover, the MPD generation unit 1101 describes, in the AdaptationSet, information regarding the movement limited range of the focal position in the virtual viewpoint video (step S1503). The MPD generation unit 1101 describes, in the AdaptationSet, information regarding the movement limited range of the focal position that the focal point movement range generation unit 1104 has obtained by analyzing the segment file or by receiving an input from the outside.

Note that the processing in steps S1501 to S1503 need not be executed in the order illustrated in FIG. 15, and the respective pieces of processing may be executed in any order.

As a result of an MPD that specifies the movement limited range of a virtual viewpoint video being generated as described above, the apparatus that has received this MPD can perform display control of the virtual viewpoint video in accordance with this description. Accordingly, the virtual viewpoint video can be displayed using the appropriate viewpoint position, line of sight direction, and focal position, and the user experience can be improved.

Processing Example 2-5

Figure 16:
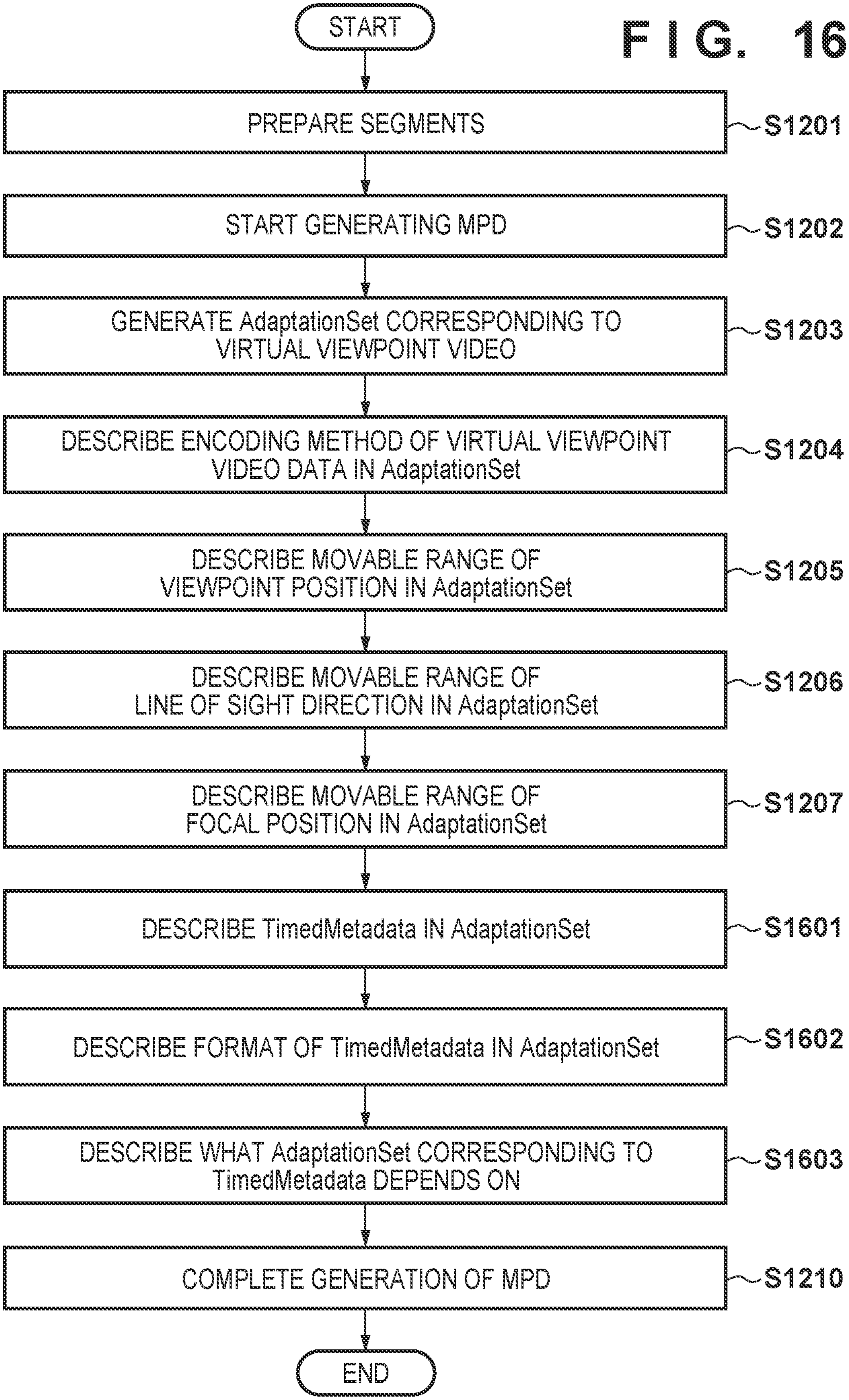
FIG. 16 is a flowchart illustrating a fifth example of the processing flow of the server.

This processing example is an example of the processing flow corresponding to the processing example 1-5, and relates to the processing when an MPD such as the MPD 2100 in FIG. 21 is generated. An example of this processing flow is shown in FIG. 16. Note that, in the processing in FIG. 16, the steps in which processing similar to that in the processing example 2-1 is executed are given the same reference numerals as those in FIG. 12, and the description thereof will be omitted.

In step S1601, the MPD generation unit 1101 generates an AdaptationSet including TimedMetadata. The TimedMetadata may be stored in an AdaptationSet that is different from the AdaptationSet generated in step S1203. Also, a plurality of pieces of TimedMetadata may be stored in one AdaptationSet. Note that when a plurality of pieces of TimedMetadata are stored in one AdaptationSet, each TimedMetadata is included in a different Representation.

Also, the MPD generation unit 1101 describes, in the AdaptationSet including TimedMetadata, a value for specifying the format of the TimedMetadata as an encoding method (step S1602). Note that, here, a value indicating that the target TimedMetadata is TimedMetadata relating to a virtual viewpoint video is described. The MPD generation unit 1101 may determine this format by analyzing this TimedMetadata or by receiving an input from the outside. Note that the value of the encoding method of the TimedMetadata may be described in a Representation.

Moreover, the MPD generation unit 1101 describes the AdaptationSet on which the AdaptationSet including TimedMetadata depends as the AdaptationSet to be dependent on (step S1610). The MPD generation unit 1101 may determine the AdaptationSet to be dependent on by analyzing this TimedMetadata or by receiving an input from the outside.

In this way, when a creator of the virtual viewpoint video desires to cause the user to view the virtual viewpoint video in accordance with the predetermined viewpoint position, line of sight direction, and focal position, for example, the server 102 can describe such a setting using the TimedMetadata. As a result, the apparatus that has received this MPD can display the virtual viewpoint video as intended by its creator. Also, it becomes possible that some users on which limitation is imposed are allowed to view the virtual viewpoint video at a specific viewpoint position, line of sight direction, and focal position, and users, on which limitation is not imposed, are allowed to view the virtual viewpoint video at a free viewpoint position, line of sight direction, and focal position. Also, both of the users are allowed to view the virtual viewpoint video at a recommended viewpoint position, line of sight direction, and focal position.

As in the processing examples described above, the server 102 generates and transmits an MPD relating to video data separately from the video data. With this, the receiver of this MPD does not obtain unnecessary video data by obtaining video data that can be decoded by its own apparatus and not obtaining video data that cannot be decoded. The opportunity of the receiver of the MPD being able to view a virtual viewpoint video can be increased by reliably causing the receiver to recognize, if the virtual viewpoint video is present, the presence thereof. When the video data is virtual viewpoint video data, the viewpoint position, line of sight direction, and focal position when its virtual viewpoint video is viewed can be limited by the description in the MPD. Accordingly, inconveniences such as the receiver of the MPD trying to decode video data that cannot be decoded, and an error due to using the viewpoint position, line of sight direction, and focal position that should not be set can be prevented from occurring.

In the present embodiment, metadata such as the viewpoint position, line of sight direction, and focal position is included in an MPD including information regarding a virtual viewpoint video, all of these are not essential, and only the viewpoint position may be included in the MPD as metadata, for example. Also, another setting element may be included as metadata in addition to at least one of the viewpoint position, line of sight direction, and focal position. In this way, as a result of using at least any one piece of setting information as metadata, flexible control can be performed when reproducing video data.

Also, in the present embodiment, MPEG-DASH has been described as an example, but there is no limitation thereto. The discussion described above can be applied to standards such as HTTP Live Streaming and Microsoft Smooth Streaming that include a play list, for example. That is, as a result of describing metadata relating to a virtual viewpoint video in data that is different from video data such as a play list, processing similar to the processing described above can be performed.

Note that, in the present embodiment, the processing in which metadata relating to virtual viewpoint video data is described in a play list has been described, but there is no limitation thereto, and the metadata relating to virtual viewpoint video data may be provided with another method. For example, the metadata relating to virtual viewpoint video data may be included in a Javascript file, or the like, or a server may provide metadata relating to virtual viewpoint video data using a different type of protocol. With these methods, the metadata needed to obtain virtual viewpoint video data can be provided to a client without using a play list.

Also, in the present embodiment, an example in which a server encodes and distributes a virtual viewpoint video has been described, but not only the virtual viewpoint video data but also video data encoded by another encoding method may also be distributed in parallel. For example, video data obtained by encoding a video generated by limiting movements of the viewpoint/line of sight based on virtual viewpoint video data using HEVC, AVC, VP8, VP9, or another encoding method may be distributed. With this, even if a client that is not compatible with encoding of a virtual viewpoint video can reproduce a moving image corresponding to the virtual viewpoint video.

Note that any encoding method may be used to obtain virtual viewpoint video data. For example, Light Field Compression and Plenoptic Image Compression that are encoding methods for encoding so as to include focal point information may be used, or an encoding method that is different from these may be used. For example, an encoding method with which data that does not include focal point information is generated may be used. Also, in the present embodiment, the virtual viewpoint video data subjected to encoding processing is stored in a moving image container. The moving image container may be ISOBMFF (ISO Base Media File Format), MPEG2-TS, WebM, or another moving image container format. Also, the video data may be divided into a plurality of moving image files by segmentation when being stored in a moving image container format, but there is no limitation thereto, and the video data may not be divided. Note that, when the video data is not divided, a client obtains all of a single video data file, or obtains segments by designating a specific range (byte range).

As described above, the server 102 describes, in an MPD file, metadata for identifying the virtual viewpoint video data. Also, the client 101 analyzes metadata relating to the virtual viewpoint video data described in the MPD file, manages the analyzed result, and reproduces a video based on the management contents. With this, the client 101 obtains video data that the client 101 can decode, and can execute control of the operations regarding the video data without analyzing the video data. Therefore, the client 101 can obtain virtual viewpoint video data from the server 102 while reducing the processing load.

Note that the method described above can be applied to a system in which first data that relates to video data, but is not video data is provided to a client, and the client obtains second data including video data based on the first data. That is, when an MPD file or a file in any other format is used as the first data, the description method as described above can be used with respect to the first data. Note that processing similar to the processing described above may be executed in place of, or in addition to, the video data with respect to voice data as well. That is, the method described above can also be applied to other media data, such as virtual listening point sound.

According to the present invention, media data can be distributed while suppressing a processing load.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:

an obtainment unit configured to obtain first data in which information regarding video data is described, and second data including the video data;

a determination unit configured to determine whether a predetermined value is described in the first data, the predetermined value indicating that information regarding a virtual viewpoint video that can be viewed by setting at least one of a viewpoint position, a line of sight direction, and a focal position is included; and a control unit configured to control reproduction of video data included in the second data, wherein the obtainment unit obtains the second data based on a result of a determination made by the determination unit and the first data, wherein the virtual viewpoint video is generated based on background data and object data, and wherein the predetermined value indicates that information regarding at least one of the background data and the object data is included.

2. The information processing apparatus according to claim 1, wherein, in a case when the information processing apparatus can handle reproduction of the virtual viewpoint video and the predetermined value is described in the first data, the obtainment unit obtains the second data including virtual viewpoint video data associated with information included in the first data.

3. The information processing apparatus according to claim 2, wherein the first data further includes, along with the predetermined value, information regarding a range of at least one of a viewpoint position, a line of sight direction, and a focal position in the virtual viewpoint video, and the control unit performs the reproduction control so as to avoid a situation in which at least one of a viewpoint position, a line of sight direction, and a focal position in the virtual viewpoint video is set to a value that is not included in the range.

4. The information processing apparatus according to claim 2, wherein the first data further includes, along with the predetermined value, information regarding, with respect to each of subspaces obtained by dividing the virtual viewpoint video, a range relating to at least one of a viewpoint position, a line of sight direction, and a focal position for specifying the subspace, and the obtainment unit obtains, based on the information regarding a subspace corresponding to at least one of settings of a viewpoint position, a line of sight direction, and a focal position in the virtual viewpoint video, the second data including virtual viewpoint video data relating to the subspace.

5. The information processing apparatus according to claim 2, wherein the first data further includes, along with the predetermined value, designation information indicating at least one of a viewpoint position, a line of sight direction, and a focal position for each time, and the control unit performs the reproduction control such that at least one of a viewpoint position, a line of sight direction, and a focal position is set for each time when reproducing the virtual viewpoint video, based on the designation information.

6. The information processing apparatus according to claim 5, further comprising a selection unit configured to select whether or not the designation information is to be used, wherein the control unit, if the selection unit has selected that the designation information is to be used, performs control so as to set at least one of a viewpoint position, a line of sight direction, and a focal position for each time when reproducing the virtual viewpoint video, based on the designation information, and if the selection unit has selected that the designation information is not to be used, performs control so as to set at least one of a viewpoint position, a line of sight direction, and a focal position when reproducing the virtual viewpoint video based on a user operation.

7. The information processing apparatus according to claim 2, wherein the first data further includes, along with the predetermined value, information regarding a limit range in which a setting of at least one of a viewpoint position, a line of sight direction, and a focal position is limited, and the control unit performs the reproduction control so as to avoid a situation in which at least one of a viewpoint position, a line of sight direction, and a focal position in the virtual viewpoint video is set to a value that is included in the limit range.

8. The information processing apparatus according to claim 1, wherein the first data is provided as a Media Presentation Description of MPEG-DASH.

9. An information providing apparatus that provides, to an information processing apparatus that obtains second data including video data based on first data in which information regarding video data is described, the first data, the information providing apparatus comprising:

a generating unit configured to generate the first data including a predetermined value indicating that information regarding a virtual viewpoint video that can be viewed by setting at least one of a viewpoint position, a line of sight direction, and a focal position is included; and a providing unit configured to provide the first data to the information processing apparatus, wherein the virtual view point video is generated based on background data and object data, and the generating unit generates the first data including a value, as the predetermined value, indicating that information regarding at least one of the background data and the object data is included.

10. The information providing apparatus according to claim 9, wherein the generating unit generates the first data that further includes, along with the predetermined value, information regarding a range relating to at least one of a viewpoint position, a line of sight direction, and a focal position in the virtual viewpoint video.

11. The information providing apparatus according to claim 9, wherein the generating unit generates the first data further including, along with the predetermined value, information regarding, with respect to each of subspaces obtained by dividing the virtual viewpoint video, a range relating to at least one of a viewpoint position, a line of sight direction, and a focal position for specifying the subspace.

12. The information providing apparatus according to claim 9, wherein the generating unit generates the first data further including, along with the predetermined value, designation information indicating at least one of a viewpoint position, a line of sight direction, and a focal position for each time.

13. The information providing apparatus according to claim 9, wherein the generating unit generates the first data further including, along with the predetermined value, information regarding a limit range in which a setting of at least one of a viewpoint position, a line of sight direction, and a focal position is limited.

14. The information providing apparatus according to claim 9, wherein the generating unit generates a Media Presentation Description of MPEG-DASH as the first data.

15. A control method of controlling an information processing apparatus, the method comprising:

obtaining first data in which information regarding video data is described;

determining whether a predetermined value indicating that information regarding a virtual viewpoint video that can be viewed by setting at least one of a viewpoint position, a line of sight direction, and a focal position is included is described in the first data;

obtaining second data including video data based on a result of determination in the determining and the first data; and controlling reproduction of video data included in the second data, wherein the virtual viewpoint video is generated based on background data and object data, and the predetermined value indicates that information regarding at least one of the background data and the object data is included.

16. A control method of controlling an information providing apparatus that provides, to an information processing apparatus that obtains second data including video data based on first data in which information regarding video data is described, the first data, the control method comprising:

generating the first data including a predetermined value indicating that information regarding a virtual viewpoint video that can be viewed by setting at least one of a viewpoint position, a line of sight direction, and a focal position is included; and providing the first data to the information processing apparatus, wherein the virtual viewpoint video is generated based on background data and object data, and wherein the first data includes a value, as the predetermined value, indicating that information regarding at least one of the background data and the object data is included is generated.

17. A non-transitory computer-readable storage medium that stores a program for causing a computer included in an information processing apparatus:

to obtain first data in which information regarding video data is described;

to determine whether a predetermined value indicating that information regarding a virtual viewpoint video that can be viewed by setting at least one of a viewpoint position, a line of sight direction, and a focal position is included is described in the first data;

to obtain second data including video data based on a result of determination in the determining and the first data; and to control reproduction of video data included in the second data, wherein the virtual viewpoint video is generated based on background data and object data, and the predetermined value indicates that information regarding at least one of the background data and the object data is included.

18. A non-transitory computer-readable storage medium that stores a program for causing a computer included in an information providing apparatus, which provides, to an information processing apparatus that obtains second data including video data based on first data in which information regarding video data is described, the first data:

to generate the first data including a predetermined value indicating that information regarding a virtual viewpoint video that can be viewed by setting at least one of a viewpoint position, a line of sight direction, and a focal position is included; and to provide the first data to the information processing apparatus, wherein the virtual viewpoint video is generated based on background data and object data, and the first data includes a value, as the predetermined value, indicating that information regarding at least one of the background data and the object data is included is generated.

* * * * *